US012041386B2

(12) United States Patent
Wang

(10) Patent No.: US 12,041,386 B2
(45) Date of Patent: Jul. 16, 2024

(54) DEPENDENT RANDOM ACCESS POINT INDICATION IN VIDEO BITSTREAMS

(71) Applicant: Lemon Inc., Grand Cayman (KY)

(72) Inventor: Ye-Kui Wang, San Diego, CA (US)

(73) Assignee: Lemon Inc., Grand Cayman (KY)

( * ) Notice: Subject to any disclaimer, the term of this patent is extended or adjusted under 35 U.S.C. 154(b) by 0 days.

(21) Appl. No.: 17/484,338

(22) Filed: Sep. 24, 2021

(65) Prior Publication Data
US 2022/0103847 A1    Mar. 31, 2022

Related U.S. Application Data

(60) Provisional application No. 63/084,953, filed on Sep. 29, 2020.

(51) Int. Cl.
*H04N 19/46* (2014.01)
*H04N 7/01* (2006.01)
(Continued)

(52) U.S. Cl.
CPC ............. *H04N 7/01* (2013.01); *H04N 19/105* (2014.11); *H04N 19/107* (2014.11);
(Continued)

(58) Field of Classification Search
CPC ...... H04N 7/01; H04N 19/105; H04N 19/107; H04N 19/172; H04N 19/30; H04N 19/46; H04N 19/70; H04N 19/91
(Continued)

(56) References Cited

U.S. PATENT DOCUMENTS 9,264,717 B2   2/2016 Chen et al.
9,319,657 B2   4/2016 Kang et al.
(Continued)

FOREIGN PATENT DOCUMENTS

CN      111526368 A    8/2020
JP     2017522766 A    8/2017
(Continued)

OTHER PUBLICATIONS

Boyce et al. ""Versatile Supplemental Enhancement Information Messages for Coded Video Bitstreams (Draft 5),"" Joint Video Experts Team (JVET)of ITU-T SG 16 WP 3 and ISO/IEC JTC 1/SC 29/WG 1118th Meeting: by teleconference, Apr. 15-24, 2020, document JVET-S2007, 2020.
(Continued)

*Primary Examiner* — Albert Kir
(74) *Attorney, Agent, or Firm* — Perkins Coie LLP

(57) ABSTRACT

Systems, methods and apparatus for encoding, decoding or transcoding visual media data are described. One example method of processing visual media data includes performing a conversion between visual media data and a bitstream of the visual media data according to a format rule, wherein the format rule specifies whether and how a second type of supplemental enhancement information (SEI) message that is different from a first type of SEI message is included in the bitstream, and wherein the first type of the SEI message and the second type of the SEI message indicate a first type of dependent random access point (DRAP) picture and a second type of DRAP picture, respectively.

16 Claims, 9 Drawing Sheets

(51) Int. Cl.
*H04N 19/105* (2014.01)
*H04N 19/107* (2014.01)
*H04N 19/172* (2014.01)
*H04N 19/30* (2014.01)
*H04N 19/70* (2014.01)
*H04N 19/91* (2014.01)

(52) U.S. Cl.
CPC ........... *H04N 19/172* (2014.11); *H04N 19/30* (2014.11); *H04N 19/46* (2014.11); *H04N 19/70* (2014.11); *H04N 19/91* (2014.11)

(58) Field of Classification Search
USPC .................................................. 375/240.26
See application file for complete search history.

(56) References Cited

U.S. PATENT DOCUMENTS

| | | | |
|---|---|---|---|
| 9,402,076 B2 | 7/2016 | Wang et al. | |
| 9,479,776 B2 | 10/2016 | Wang et al. | |
| 9,525,883 B2 | 12/2016 | Wang et al. | |
| 9,532,052 B2 | 12/2016 | Chen et al. | |
| 9,591,303 B2 | 3/2017 | Ramasubramonian et al. | |
| 9,596,486 B2 | 3/2017 | Ramasubramonian et al. | |
| 9,648,322 B2 | 5/2017 | Wang | |
| 9,648,348 B2 | 5/2017 | Wang et al. | |
| 9,736,476 B2 * | 8/2017 | Wang | H04N 19/40 |
| 9,807,406 B2 | 10/2017 | Ramasubramonian et al. | |
| 9,860,540 B2 | 1/2018 | Wang et al. | |
| 10,003,815 B2 | 6/2018 | Ramasubramonian et al. | |
| 10,148,983 B2 | 12/2018 | Hendry et al. | |
| 10,212,435 B2 | 2/2019 | Ramasubramonian et al. | |
| 10,264,272 B2 | 4/2019 | Seregin et al. | |
| 10,306,253 B2 | 5/2019 | Wang et al. | |
| 10,547,834 B2 | 1/2020 | Wang | |
| 11,539,957 B2 | 12/2022 | Choi et al. | |
| 11,770,498 B2 | 9/2023 | Wang | |
| 2013/0279599 A1 * | 10/2013 | Wang | H04N 19/70 375/240.01 |
| 2014/0003536 A1 * | 1/2014 | Wang | H04N 19/134 375/240.25 |
| 2014/0092994 A1 | 4/2014 | Wang | |
| 2014/0301456 A1 | 10/2014 | Wang et al. | |
| 2015/0016502 A1 | 1/2015 | Rapaka et al. | |
| 2016/0165237 A1 | 6/2016 | Chen et al. | |
| 2016/0219301 A1 | 7/2016 | Pettersson et al. | |
| 2016/0373777 A1 | 12/2016 | Pettersson et al. | |
| 2019/0174144 A1 * | 6/2019 | Hannuksela | H04N 19/70 |
| 2020/0177923 A1 | 6/2020 | Chen et al. | |
| 2022/0103781 A1 | 3/2022 | Wang | |
| 2022/0103867 A1 | 3/2022 | Wang | |
| 2022/0109865 A1 * | 4/2022 | Deshpande | H04N 19/159 |
| 2023/0353748 A1 * | 11/2023 | Wang | H04N 19/70 |
| 2024/0040157 A1 * | 2/2024 | Wang | H04N 19/136 |

FOREIGN PATENT DOCUMENTS

| | | | | |
|---|---|---|---|---|
| TW | 202005401 A | | 1/2020 | |
| WO | 2015192990 A1 | | 12/2015 | |
| WO | WO-2015192989 A1 | * | 12/2015 | ........... H04N 19/107 |
| WO | WO-2015192990 A1 | * | 12/2015 | ........... H04N 19/107 |
| WO | WO-2015192991 A1 | * | 12/2015 | ........... H04N 19/107 |
| WO | WO-2016126181 A1 | * | 8/2016 | ........... H04N 19/105 |
| WO | WO-2022148269 A1 | * | 7/2022 | |

OTHER PUBLICATIONS

Bross et al. "Versatile Video Coding (Draft 10)," Joint Video Experts Team (JVET) of ITU-T SG 16 WP 3 and ISO/IEC JTC 1/SC 29/WG 11 19th Meeting: by teleconference, Jun. 22-Jul. 1, 2020, document JVET-S2001, 2020.
Chen et al. "Algorithm Description of Joint Exploration Test Model 7 (JEM 7)," Joint Video Exploration Team (JVET) of ITU-T SG 16 WP 3 and ISO/IEC JTC 1/SC 29/WG 11, 7th Meeting: Torino, IT, Jul. 13-21, 2017, document JVET-G1001, 2017.
"Information Technology—High Efficiency Coding and Media Delivery in Heterogeneous Environments—Part 2: High Efficiency Video Coding" Apr. 20, 2018, ISO/DIS 23008, 4th Edition.
"Information Technology—Coded Representation of Immersive Media—Part 3: Versatile Video Coding" ISO/IEC JTC 1/SC 29 /WG 11 N 18692, Text of ISO/IEC CD 23090-3, ISO/IEC JTC 1/SC 29/WG 11, Jul. 12, 2019.
"Versatile Supplemental Enhancement Information Messages for Coded Video Bitstreams," Series H: Audiovisual and Multimedia Systems: Infrastructure of Audiovisual Services—Coding of Moving Video, ITU-T Telecommunication Standardization Sector of ITU, H.274, Aug. 2020.
Wang et al. ""AHG17: EDR—External Decoding Refresh."" Joint Video Experts Team (JVET)of ITU-T SG 16 WP 3 and ISO/IEC JTC 1/SC 29/WG 1114th Meeting: Geneva, CH, Mar. 19-27, 2019, document JVET-N0119, 2019.
Wang et al. ""AHG17: On External Decoding Refresh (EDR),"" Joint Video Experts Team (JVET)of ITU-T SG 16 WP 3 and ISO/IEC JTC 1/SC 29/WG 1115th Meeting: Gothenburg, SE, Jul. 3-12, 2019, document JVET-O0149, 2019.
Wang et al. ""AHG17: On External Decoding Refresh (EDR),"" Joint Video Experts Team (JVET)of ITU-T SG 16 WP 3 and ISO/IEC JTC 1/SC 29/WG 1116th Meeting: Geneva, CH, Oct. 1-11, 2019, document JVET-P0114, 2019.
Yu et al. ""Video Coding Based on Cross RAP Referencing (CRR),"" Joint Video Exploration Team (JVET)of ITU-T SG 16 WP 3 and ISO/IEC JTC 1/SC 29/WG 1113th Meeting: Marrakech, MA, Jan. 9-18, 2019, document JVET-M0360, 2019.
Boyce et al. "Supplemental Enhancement Information Messages for Coded Video Bitstreams (Draft 1)," Joint Video Experts Team (JVET) of ITU-T SG 16 WP 3 and ISO/IEC JTC 1/SC 29/WG 11 15th Meeting Gothenburg, SE, Jul. 3-12, 2019, document JVET-O2007, 2019.
Pettersson et al. "HLS: Dependent RAP Indication SEI Messages," Joint Collaborative Team on Video Coding (JCT-VC) of ITU-T SG 16 WP 3 and ISO/IEC JTC 1/SC 29/WG 11, 18th Meeting, Sapporo, JP, Jun. 30-Jul. 9, 2014, document JCTVC-R0059, 2014.
Pettersson et al. "HLS: Dependent RAP Indication SEI Messages," Joint Collaborative Team on Video Coding (JCT-VC) of ITU-T SG 16 WP 3 and ISO/IEC JTC 1/SC 29/WG 11, 19th Meeting, Strasbourg, FR, Oct. 17-24, 2014, document JCTVC-S0095, 2014.
Wang, Ye-Kui, "AHG9: SEI Message for Support of Cross RAP Referencing Based on Video Coding," Joint Video Experts Team (JVET) of ITU-T SG 16 WP 3 and ISO/IEC JTC 1/SC 29 20th Meeting, by Teleconference, Oct. 7-16, 2020, document JVET-T0071, 2020.
Yu et al. "Crowdsourcing Based Cross Random Access Point Referencing for Video Coding," IEEE Signal Processing Letters, 2020, 27:560-564.
Extended European Search Report from European Patent Application 21199454.6 dated Mar. 2, 2022.
Extended European Search Report from European Patent Application 21199401.7 dated Mar. 1, 2022.
Examination Report from Indian Patent Application 202144044034 dated Apr. 22, 2022.
Examination Report from Indian Patent Application 202144044009 dated Apr. 22, 2022.
Examination Report from Indian Patent Application 202144043932 dated Jun. 1, 2022.
Boyce et al. "Supplemental Enhancement Information for Coded Video Bitstreams (Draft 4)," Joint Video Experts Team (JVET) of ITU-T SG 16 WP 3 and ISO/IEC JTC 1/SC 29/WG 11 18th Meeting: by teleconference, Apr. 15-24, 2020, document JVET-R2007, 2020. (cited in JP2021-158893 OA mailed Jan. 17, 2023).
Chen et al. "AHG17: New NAL Unit Types for VVC," Joint Video Experts Team (JVET)of ITU-T SG 16 WP 3 and ISO/IEC JTC 1/SC 29/WG 1114th Meeting: Geneva, Switzerland, Mar. 19-27, 2019, JVET-N0072, 2019. (cited in JP2021-158893 OA mailed Jan. 17, 2023).
Lim et al. "Simplification on Default Quantization Matrix Signaling," Joint Collaborative Team on Video Coding (JCT-VC) of

(56) References Cited

OTHER PUBLICATIONS

ITU-T SG 16 WP 3 and ISO/IEC JTC 1/SC 29/WG 11 9th Meeting, Geneva, CH, 27 Apr.-May 7, 2012, document JCTVC-I0101, 2012. (cited in JP2021-158897 OA mailed Jan. 17, 2023).
Recommendation ITU-T H.266 (Aug. 2020), [online], ITU-T, Aug. 29, 2020, pp. 3-13 and 499-500, <URL: https://www.itu.int/rec/T-REC-H.266-202008-I/en> (cited in JP2021-158897 OA mailed Jan. 17, 2023).
Recommendation ITU-T H.265 (Feb. 2018), [online], ITU-T, Feb. 13, 2018,pp. 287-292,304,376, retrieved from the Internet, May 2, 2020 <URL: https://www.itu.int/rec/T-REC-H.265-201802-S/en>. (cited in JP2021-158894 OA2 mailed Jul. 25, 2023).
Notice of Allowance from U.S. Appl. No. 17/484,919 dated Dec. 5, 2023.
Notice of Hearing from Indian Patent Application 202144044009 dated Jan. 18, 2024.

* cited by examiner

DEPENDENT RANDOM ACCESS POINT INDICATION IN VIDEO BITSTREAMS

CROSS REFERENCE TO RELATED APPLICATIONS

Under the applicable patent law and/or rules pursuant to the Paris Convention, this application is made to timely claims the priority to and benefits of U.S. Provisional Patent Application No. 63/084,953, filed on Sep. 29, 2020. For all purposes under the law, the entire disclosure of the aforementioned application is incorporated by reference as part of the disclosure of this application.

TECHNICAL FIELD

This patent document relates to digital video coding technologies, including video encoding, transcoding or decoding.

BACKGROUND

Digital video accounts for the largest bandwidth use on the internet and other digital communication networks. As the number of connected user devices capable of receiving and displaying video increases, it is expected that the bandwidth demand for digital video usage will continue to grow.

SUMMARY

The present document discloses techniques that can be used by video encoders and decoders for processing coded representation of a video or an image according to a file format.

In one example aspect, a method of processing visual media data is disclosed. The method includes: performing a conversion between visual media data and a bitstream of the visual media data including multiple layers according to a format rule; wherein the format rule specifies that a supplemental enhancement information (SEI) message is included in the bitstream to indicate that it is allowed for a decoder to decode 1) a dependent random access point (DRAP) picture in a layer associated with the SEI message and/or 2) pictures included in the layer and following the DRAP picture in a decoding order and an output order, without having to decode other pictures in the layer except for an intra random access point (IRAP) picture associated with the DRAP picture.

In another example aspect, another method of processing visual media data is disclosed. The method includes: performing a conversion between visual media data and a bitstream of the visual media data according to a format rule, wherein the format rule specifies whether and how a second type of supplemental enhancement information (SEI) message that is different from a first type of SEI message is included in the bitstream, and wherein the first type of the SEI message and the second type of the SEI message indicate a first type of dependent random access point (DRAP) picture and a second type of DRAP picture, respectively.

In another example aspect, another method of processing visual media data is disclosed. The method includes: performing a conversion between visual media data and a bitstream of the visual media data according to a format rule, wherein the format rule specifies that a supplemental enhancement information (SEI) message that refers to a dependent random access point (DRAP) picture is included in the bitstream, and wherein the format rule further specifies that the SEI message includes a syntax element indicating a number of intra random access point (IRAP) pictures or dependent random access point (DRAP) pictures that are within a same coded layer video sequence (CLVS) as the DRAP picture.

In yet another example aspect, a video processing apparatus is disclosed. The video processing apparatus comprises a processor configured to implement above-described methods.

In yet another example aspect, a method of storing visual media data to a file including one or more bitstreams is disclosed. The method corresponds to above-described methods and further includes storing the one or more bitstream to a non-transitory computer-readable recording medium.

In yet another example aspect, a computer readable medium that stores a bitstream is disclosed. The bitstream is generated according to above-described methods.

In yet another example aspect, a video processing apparatus for storing a bitstream is disclosed, wherein the video processing apparatus is configured to implement above-described methods.

In yet another example aspect, a computer readable medium on which a bitstream complies to a file format that is generated according to above-described methods is disclosed.

These, and other, features are described throughout the present document.

DETAILED DESCRIPTION

Figure 1:
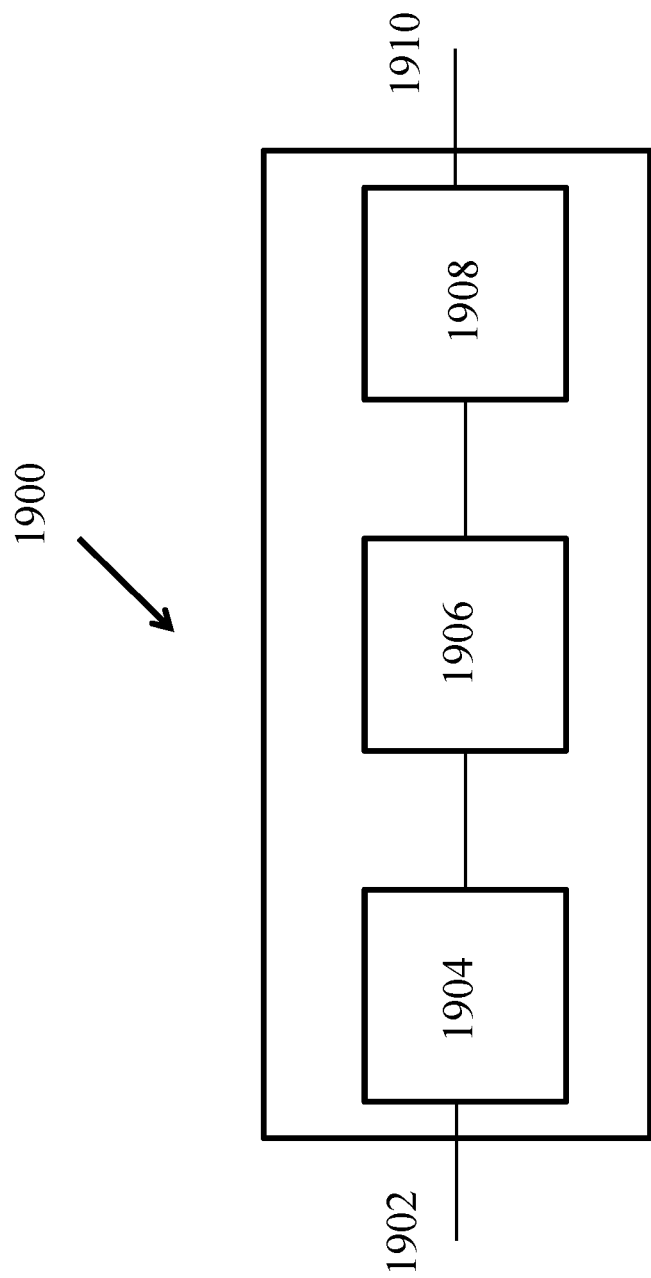
FIG. 1 is a block diagram of an example video processing system.

Section headings are used in the present document for ease of understanding and do not limit the applicability of techniques and embodiments disclosed in each section only to that section. Furthermore, H.266 terminology is used in some description only for ease of understanding and not for limiting scope of the disclosed techniques. As such, the techniques described herein are applicable to other video codec protocols and designs also. In the present document, editing changes are shown to text by strikethrough indicating cancelled text and highlight indicating added text (including boldface italic), with respect to the current draft of the VVC specification.

1. INITIAL DISCUSSION

This document is related to video coding technologies. Specifically, it is related to support of cross random access point (RAP) referencing in video coding based on Supplemental Enhancement Information (SEI) messages. The ideas may be applied individually or in various combination, to any video coding standard or non-standard video codec, e.g., the recently finalized Versatile Video Coding (VVC).

2. ABBREVIATIONS

ACT adaptive colour transform
ALF adaptive loop filter
AMVR adaptive motion vector resolution
APS adaptation parameter set
AU access unit
AUD access unit delimiter
AVC advanced video coding (Rec. ITU-T H.264|ISO/IEC 14496-10)
B bi-predictive
BCW bi-prediction with CU-level weights
BDOF bi-directional optical flow
BDPCM block-based delta pulse code modulation
BP buffering period
CABAC context-based adaptive binary arithmetic coding
CB coding block
CBR constant bit rate
CCALF cross-component adaptive loop filter
CLVS coded layer video sequence
CLVSS coded layer video sequence start
CPB coded picture buffer
CRA clean random access
CRC cyclic redundancy check
CRR cross RAP referencing
CTB coding tree block
CTU coding tree unit
CU coding unit
CVS coded video sequence
CVSS coded video sequence start
DPB decoded picture buffer
DCI decoding capability information
DRAP dependent random access point
DU decoding unit
DUI decoding unit information
EG exponential-Golomb
EGk k-th order exponential-Golomb
EOB end of bitstream
EOS end of sequence
FD filler data
FIFO first-in, first-out
FL fixed-length
GBR green, blue, and red
GCI general constraints information
GDR gradual decoding refresh
GPM geometric partitioning mode
HEVC high efficiency video coding (Rec. ITU-T H.265|ISO/IEC 23008-2)
HRD hypothetical reference decoder
HSS hypothetical stream scheduler
I intra
IBC intra block copy
IDR instantaneous decoding refresh
ILRP inter-layer reference picture
IRAP intra random access point
LFNST low frequency non-separable transform
LPS least probable symbol
LSB least significant bit
LTRP long-term reference picture
LMCS luma mapping with chroma scaling
MIP matrix-based intra prediction
MPS most probable symbol
MSB most significant bit
MTS multiple transform selection
MVP motion vector prediction
NAL network abstraction layer
OLS output layer set
OP operation point
OPI operating point information
P predictive
PH picture header
POC picture order count
PPS picture parameter set
PROF prediction refinement with optical flow
PT picture timing
PU picture unit
QP quantization parameter
RADL random access decodable leading (picture)
RAP random access point
RASL random access skipped leading (picture)
RB SP raw byte sequence payload
RGB red, green, and blue
RPL reference picture list
SAO sample adaptive offset
SAR sample aspect ratio
SEI supplemental enhancement information
SH slice header
SLI subpicture level information
SODB string of data bits
SPS sequence parameter set
STRP short-term reference picture
STSA step-wise temporal sublayer access
TR truncated rice
TU transform unit
VBR variable bit rate
VCL video coding layer
VPS video parameter set
VSEI versatile supplemental enhancement information (Rec. ITU-T H.274|ISO/IEC 23002-7)
VUI video usability information
VVC versatile video coding (Rec. ITU-T H.2661 ISO/IEC 23090-3)

3. VIDEO CODING DISCUSSION

3.1. Video Coding Standards

Video coding standards have evolved primarily through the development of the well-known ITU-T and ISO/IEC standards. The ITU-T produced H.261 and H.263, ISO/IEC produced MPEG-1 and MPEG-4 Visual, and the two organizations jointly produced the H.262/MPEG-2 Video and H.264/MPEG-4 Advanced Video Coding (AVC) and H.265/HEVC standards. Since H.262, the video coding standards are based on the hybrid video coding structure wherein temporal prediction plus transform coding are utilized. To explore the future video coding technologies beyond HEVC, the Joint Video Exploration Team (JVET) was founded by VCEG and MPEG jointly in 2015. Since then, many new methods have been adopted by JVET and put into the reference software named Joint Exploration Model (JEM). The JVET was later renamed to be the Joint Video Experts Team (JVET) when the Versatile Video Coding (VVC) project officially started. VVC is the new coding standard, targeting at 50% bitrate reduction as compared to HEVC, that has been finalized by the JVET at its 19th meeting ended at Jul. 1, 2020.

The Versatile Video Coding (VVC) standard (ITU-T H.266 ISO/IEC 23090-3) and the associated Versatile Supplemental Enhancement Information (VSEI) standard (ITU-T H.274|ISO/IEC 23002-7) have been designed for use in a maximally broad range of applications, including both the traditional uses such as television broadcast, video conferencing, or playback from storage media, and also newer and more advanced use cases such as adaptive bit rate streaming, video region extraction, composition and merging of content from multiple coded video bitstreams, multiview video, scalable layered coding, and viewport-adaptive 360° immersive media.

3.2. Picture Order Count (POC) in HEVC and VVC

In HEVC and VVC, POC is basically used as a picture ID for identification of pictures in many parts of the decoding process, including DPB management, part of which is reference picture management.

With the newly introduced PH, in VVC, the information of POC least significant bits (LSB), which is used for deriving the POC value and has the same value for all slices of a picture, is signaled in the PH, as opposed to HEVC where it is signaled in the SH. VVC also allows the signaling of the POC most significant bits (MSB) cycle value in the PH, to enable the derivation of the POC value without tracking the POC MSB, which relies on the POC information of earlier decoded pictures. This, for example, allows mixing of IRAP and non-IRAP pictures within an AU in multi-layer bitstreams. An additional difference between POC signaling in HEVC and VVC is that in HEVC the POC LSB is not signaled for IDR pictures, which turned out to show some disadvantage during later development of the multi-layer extensions of HEVC, for enabling mixing of IDR and non-IDR pictures within an AU. Therefore, in VVC POC LSB information is signaled for each picture, including IDR pictures. The signaling of POC LSB information for IDR pictures also make it easier for supporting of merging of an IDR picture and a non-IDR picture from different bitstream into one picture, as otherwise handling of the POC LSB in the merged picture would need some complicated design.

3.3. Random Access and its Supports in HEVC and VVC

Random access refers to starting access and decoding of a bitstream from a picture that is not the first picture of the bitstream in decoding order. To support tuning in and channel switching in broadcast/multicast and multiparty video conferencing, seeking in local playback and streaming, as well as stream adaptation in streaming, the bitstream needs to include frequent random access points, which are typically intra coded pictures but may also be inter-coded pictures (e.g., in the case of gradual decoding refresh).

HEVC includes signaling of intra random access points (IRAP) pictures in the NAL unit header, through NAL unit types. Three types of IRAP pictures are supported, namely instantaneous decoder refresh (IDR), clean random access (CRA), and broken link access (BLA) pictures. IDR pictures are constraining the inter-picture prediction structure to not reference any picture before the current group-of-pictures (GOP), conventionally referred to as closed-GOP random access points. CRA pictures are less restrictive by allowing certain pictures to reference pictures before the current GOP, all of which are discarded in case of a random access. CRA pictures are conventionally referred to as open-GOP random access points. BLA pictures usually originate from splicing of two bitstreams or part thereof at a CRA picture, e.g., during stream switching. To enable better systems usage of IRAP pictures, altogether six different NAL units are defined to signal the properties of the IRAP pictures, which can be used to better match the stream access point types as defined in the ISO base media file format (ISOBMFF), which are utilized for random access support in dynamic adaptive streaming over HTTP (DASH).

VVC supports three types of IRAP pictures, two types of IDR pictures (one type with or the other type without associated RADL pictures) and one type of CRA picture. These are basically the same as in HEVC. The BLA picture types in HEVC are not included in VVC, mainly due to two reasons: i) The basic functionality of BLA pictures can be realized by CRA pictures plus the end of sequence NAL unit, the presence of which indicates that the subsequent picture starts a new CVS in a single-layer bitstream. ii) There was a desire in specifying less NAL unit types than HEVC during the development of VVC, as indicated by the use of five instead of six bits for the NAL unit type field in the NAL unit header.

Another key difference in random access support between VVC and HEVC is the support of GDR in a more normative manner in VVC. In GDR, the decoding of a bitstream can start from an inter-coded picture and although at the beginning not the entire picture region can be correctly decoded but after a number of pictures the entire picture region would be correct. AVC and HEVC also support GDR, using the recovery point SEI message for signaling of GDR random access points and the recovery points. In VVC, a new NAL unit type is specified for indication of GDR pictures and the recovery point is signaled in the picture header syntax structure. A CVS and a bitstream are allowed to start with a GDR picture. This means that it is allowed for an entire bitstream to contain only inter-coded pictures without a single intra-coded picture. The main benefit of specifying GDR support this way is to provide a conforming behavior for GDR. GDR enables encoders to smooth the bit rate of a bitstream by distributing intra-coded slices or blocks in multiple pictures as opposed intra coding entire pictures, thus allowing significant end-to-end delay reduction, which is considered more important nowadays than before as ultralow delay applications like wireless display, online gaming, drone based applications become more popular.

Another GDR related feature in VVC is the virtual boundary signaling. The boundary between the refreshed region (i.e., the correctly decoded region) and the unrefreshed region at a picture between a GDR picture and its recovery point can be signaled as a virtual boundary, and when signaled, in-loop filtering across the boundary would not be applied, thus a decoding mismatch for some samples at or near the boundary would not occur. This can be useful when the application determines to display the correctly decoded regions during the GDR process.

IRAP pictures and GDR pictures can be collectively referred to as random access point (RAP) pictures.

3.4. VUI and SEI Messages

VUI is a syntax structure sent as part of the SPS (and possibly also in VPS in HEVC). VUI carries information that does not affect the normative decoding process, but that can be important for proper rendering of the coded video.

SEI assists in processes related to decoding, display or other purposes. Same as VUI, SEI does not affect the normative decoding process, either. SEI is carried in SEI messages. Decoder support of SEI messages is optional. However, SEI messages do affect bitstream conformance (e.g., if the syntax of an SEI message in a bitstream does not follow the specification, then the bitstream is not conforming) and some SEI messages are needed in the HRD specification.

The VUI syntax structure and most SEI messages used with VVC are not specified in the VVC specification, but rather in the VSEI specification. The SEI messages necessary for HRD conformance testing are specified in the VVC specification. VVC v1 defines five SEI messages relevant for HRD conformance testing and VSEI v1 specifies 20 additional SEI messages. The SEI messages carried in the VSEI specification do not directly impact conforming decoder behavior and have been defined so that they can be used in a coding-format-agnostic manner, allowing VSEI to be used in the future with other video coding standards in addition to VVC. Rather than referring specifically to VVC syntax element names, the VSEI specification refers to variables, whose values are set within the VVC specification.

Compared to HEVC, the VUI syntax structure of VVC focuses only on information relevant for proper rendering of the pictures and does not contain any timing information or bitstream restriction indications. In VVC, the VUI is signaled within the SPS, which includes a length field before the VUI syntax structure to signal the length of the VUI payload in bytes. This makes it possible for a decoder to easily jump over the information, and more importantly, allows convenient future VUI syntax extensions by directly adding new syntax elements to the end of the VUI syntax structure, in a similar manner as SEI message syntax extension.

The VUI syntax structure contains the following information:
 The content being interlaced or progressive;
 Whether the content contains frame-packed stereoscopic video or projected omnidirectional video;
 Sample aspect ratio;
 Whether the content is appropriate for overscan display;
 Color description, including color primaries, matrix and transfer characteristics, which is particularly important to be able to signal ultra high definition (UHD) vs high definition (HD) color space as well as high dynamic range (HDR);
 Chroma location compared to luma (for which the signaling was clarified for progressive content compared to HEVC).

When the SPS does not contain any VUI, the information is considered unspecified and has to be conveyed via external means or specified by the application if the content of the bitstream is intended for rendering on a display.

Table 1 lists all the SEI messages specified for VVC v1, as well as the specification containing their syntax and semantics. Of the 20 SEI messages specified in the VSEI specification, many were inherited from HEVC (for example, the filler payload and both user data SEI messages). Some SEI messages are essential for correct processing or rendering of the coded video content. This is for example the case for the mastering display color volume, the content light level information or the alternative transfer characteristics SEI messages which are particularly relevant for HDR content. Other examples include the equirectangular projection, sphere rotation, region-wise packing or omnidirectional viewport SEI messages, which are relevant for signaling and processing of 360° video content.

TABLE 1

List of SEI messages in VVC v1

| Name of SEI message | Purpose of SEI message |
|---|---|
| SEI messages specified in the VVC specification | |
| Buffering period | Initial CPB removal delays for HRD |
| Picture timing | CPB removal delays and DPB output delays for HRD |
| Decoding unit information | CPB removal delays and DPB output delays for DU based HRD |
| Scalable nesting | Mechanism to associate SEI messages with specific output layer sets, layers or sets of subpictures |
| Subpicture level information | Information about levels for subpicture sequences |
| SEI messages specified in the VSEI specification | |
| Filler payload | Filler data for adjusting the bit rate |
| User data registered by Rec. ITU-T T.35 | Convey user data, can be used as container for data by other organizations |
| User data unregistered | |
| Film grain characteristics | Model for film grain synthesis |
| Frame packing arrangement | Information about how stereoscopic video is coded in the bitstream, e.g., by packing the two pictures for each time instance of the two views into one picture |
| Parameter sets inclusion indication | Indication of whether the sequence contains all the required NAL units for decoding |
| Decoded picture hash | Hash of the decoded pictures for error detection |
| Mastering display color volume | Description of the color volume of a display used to author the content |
| Content light level information | Upper bounds for the nominal target brightness light level of the content |
| Dependent RAP indication | Indicates a picture using only the preceding RAP picture for inter prediction referencing |
| Alternative transfer characteristics | Preferred alternative value for the transfer characteristics of the content |
| Ambient viewing environment | Characteristics of the nominal ambient viewing environment for the display of the content, can be used to assist the receiver in processing content depending on the local viewing environment |
| Content color volume | Color volume characteristics of the associated picture |
| Equirectangular projection Generalized cubemap projection | Indication of the projection format applied, including information needed for remapping of the content onto a sphere for rendering in omnidirectional video applications |
| Sphere rotation | Information on rotation angles for conversion between the global and localcoordinate axes, for use in omnidirectional video applications |
| Region-wise packing | Information needed for remapping of the cropped decoded pictures, involving region-wise operations like repositioning, resizing and rotation, onto projected pictures, for use in omnidirectional video applications |
| Omnidirectional viewport | Coordinates of one or more regions corresponding to viewports recommended for display, for use in omnidirectional video applications |
| Frame-field information | Indicates how the associated picture should be displayed, its source scan, and whether it is a duplicate of a previous picture |
| Sample aspect ratio information | Information about sample aspect ratio of the associated picture |

New SEI messages that were specified for VVC v1 include the frame-field information SEI message, the sample aspect ratio information SEI message, and the subpicture level information SEI message.

The frame-field information SEI message contains information to indicate how the associated picture should be displayed (such as field parity or frame repetition period), the source scan type of the associated picture and whether the associated picture is a duplicate of a previous picture. This information used to be signaled in the picture timing SEI message in previous video coding standards, together with the timing information of the associated picture. However, it was observed that the frame-field information and timing information are two different kinds of information that are not necessarily signaled together. A typical example consists in signaling the timing information at the systems level, but signaling the frame-field information within the bitstream. It was therefore decided to remove the frame-field information from the picture timing SEI message and signal it within a dedicated SEI message instead. This change also made it possible to modify the syntax of the frame-field information to convey additional and clearer instructions to the display, such as the pairing of fields together, or more values for frame repetition.

The sample-aspect ratio SEI message enables signaling different sample aspect ratios for different pictures within the same sequence, whereas the corresponding information contained in the VUI applies to the whole sequence. It may be relevant when using the reference picture resampling feature with scaling factors that cause different pictures of the same sequence to have different sample aspect ratios.

The subpicture level information SEI message provides information of levels for the subpicture sequences.

3.5. Cross RAP Referencing

A video coding approach based on cross RAP reference (CRR), also referred to as external decoding refresh (EDR), was proposed in JVET-M0360, JVET-N0119, JVET-O0149, and JVET-P0114.

The basic idea of this video coding approach is as follows. Instead of coding random access points as intra-coded IRAP pictures (except for the very first picture in the bitstream), they are coded using inter prediction, to circumvent the unavailability of the earlier pictures if the random access points are coded as IRAP pictures. The trick is to provide a limited number of the earlier pictures, typically representing different scenes of the video content, through a separate video bitstream, which can be referred to as an external means. Such earlier pictures are referred to as the external pictures. Consequently, each external picture can be used for inter prediction referencing by pictures across the random access points. The coding efficiency gain comes from having random access points coded as inter-predicted pictures and having more available reference pictures for pictures that follow EDR pictures in decoding order.

A bitstream coded with such a video coding approach can be used in applications based on ISOBMFF and DASH as described below.

DASH Content Preparation Operations
1) A video content is encoded into one or more representations, each is of a particular spatial resolution, temporal resolution, and quality.
2) Each particular representation of a video content is represented by a main stream, and possibly also an external stream. The main stream contains coded pictures that may or may not include EDR pictures. When at least one EDR picture is included in the main stream, the external stream is also present and contains external pictures. When no EDR picture is included in the main stream, the external stream is not present.
3) Each main stream is carried in a Main Stream Representation (MSR). Each EDR picture in an MSR is the first picture of a Segment.
4) Each external stream, when present, is carried in an External Stream Representation (ESR).
5) For each Segment in an MSR starting with an EDR picture, there is a Segment in the corresponding ESR having the same Segment start time derived from the MPD, carrying the external pictures needed for decoding of that EDR picture and the subsequent pictures in decoding order in the bitstream carried in the MSR.
6) The MSRs of the same video content are included in one Adaptation Set (AS). The ESRs of the same video content are included in one AS.

DASH Streaming Operations
1) A client gets the MPD of the DASH Media Presentation, parses the MPD, selects an MSR, and determines the starting presentation time from which the content is to be consumed.
2) The client requests Segments of the MSR, starting from the Segment containing the picture having presentation time equal to (or close enough to) the starting presentation time.
   a. If the first picture in the starting Segment is an EDR picture, the corresponding Segment (having the same Segment start time derived from the MPD) in the associated ESR is also requested, preferably before requesting of the MSR Segments. Otherwise, no Segment of the associated ESR is requested.
3) When switching to a different MSR, the client requests Segments of the switch-to MSR, starting from the first Segment having Segment start time greater than that of the last requested Segment of the switch-from MSR.
   a. If the first picture in the starting Segment in the switch-to MSR is an EDR picture, the corresponding Segment in the associated ESR is also requested, preferably before requesting of the MSR Segments. Otherwise, no Segment of the associated ESR is requested.
4) When continuously operating at the same MSR (after decoding of the starting Segment after a seeking or stream switching operation), no Segment of the associated ESR needs to be requested, including when requesting any Segment starting with an EDR picture.

3.6. The DRAP Indication SEI Message

The VSEI spec includes the DRAP indication SEI message, specified as follows:

| dependent_rap_indication( payloadSize ) { | Descriptor |
|---|---|
| } | |

The picture associated with a dependent random access point (DRAP) indication SEI message is referred to as a DRAP picture.

The presence of the DRAP indication SEI message indicates that the constraints on picture order and picture referencing specified in this clause apply. These constraints can enable a decoder to properly decode the DRAP picture and the pictures that follow it in both decoding order and output order without needing to decode any other pictures except the associated IRAP picture of the DRAP picture.

The constraints indicated by the presence of the DRAP indication SEI message, which shall all apply, are as follows:
  The DRAP picture is a trailing picture.
  The DRAP picture has a temporal sublayer identifier equal to 0.
  The DRAP picture does not include any pictures in the active entries of its reference picture lists except the associated IRAP picture of the DRAP picture.

Any picture that follows the DRAP picture in both decoding order and output order does not include, in the active entries of its reference picture lists, any picture that precedes the DRAP picture in decoding order or output order, with the exception of the associated IRAP picture of the DRAP picture.

4. TECHNICAL PROBLEMS SOLVED BY DISCLOSED TECHNICAL SOLUTIONS

The functionality of the DRAP indication SEI message can be considered as a subset of the CRR approach. For simplicity, a picture associated with a DRAP indication SEI message is referred to as type 1 DRAP picture.

From encoding point of view, although the CRR approach proposed in JVET-P0114 or earlier JVET contributions was not adopted into VVC, the encoder can still encode the video bitstream in such a manner that certain pictures only rely on the associated IRAP picture for inter prediction reference (like type 1 DRAP pictures indicated by the DRAP SEI message), and certain other pictures (e.g., referred to as type 2 DRAP pictures) only rely on some pictures in the set of picture consisting of the associated IRAP picture and some other (type 1 or type 2) DRAP pictures.

However, given a VVC bitstream, it is unknown whether such type 2 DRAP pictures exist in the bitstream. Furthermore, even when it is known that such type 2 DRAP pictures exist in the bitstream, to compose a media file according to the an ISOBMFF and a DASH media presentation based on such a VVC bitstream to enable the CRR or EDR streaming operations, the file and DASH media presentation composer would need to parse and derive lots of information, including POC values and active entries in reference picture lists to figure out whether a particular picture is a type 2 DRAP picture, and, and if yes, which earlier IRAP or DRAP pictures are needed for random accessing from this particular picture, such that the proper set of pictures can be included in a separate, time-synchronized file track and DASH representation.

Yet another problem is that the semantics of the DRAP indication SEI message only apply to single-layer bitstreams.

5. A LISTING OF SOLUTIONS

To solve the above problems, and others, methods as summarized below are disclosed. The items should be considered as examples to explain the general concepts and should not be interpreted in a narrow way. Furthermore, these items can be applied individually or combined in any manner.

1) In one example, the semantics of the DRAP indication SEI message are changed such that the SEI message can be applied to multi-layer bitstreams, i.e., the semantics enable a decoder to properly decode the DRAP picture (i.e., the picture associated with a DRAP indication SEI message) and the pictures that are in the same layer and follow it in both decoding order and output order without needing to decode any other pictures in the same layer except the associated IRAP picture of the DRAP picture.
   a. In example, it is required that the DRAP picture does not include any pictures in the same layer in the active entries of its reference picture lists except the associated IRAP picture of the DRAP picture.
   b. In one example, it is required that any picture that is in the same layer and follows the DRAP picture in both decoding order and output order does not include, in the active entries of its reference picture lists, any picture that is in the same layer and precedes the DRAP picture in decoding order or output order, with the exception of the associated IRAP picture of the DRAP picture.
2) In one example, a RAP picture ID, for the DRAP picture is signalled in the DRAP indication SEI message, to specify the identifier of a RAP picture, which can be either an IRAP picture or a DRAP picture.
   a. In one example, a presence flag that indicates whether the RAP picture ID is present in the DRAP indication is signalled, and when the flag is equal to a particular value, e.g., 1, the RAP picture ID is signalled in the DRAP indication SEI message, and when the flag is equal to another value, e.g., 0, the RAP picture ID is not signalled in the DRAP indication SEI message.
3) In one example, a DRAP picture associated with a DRAP indication SEI message is allowed to refer to either the associated IRAP picture or the previous picture in decoding order that is a GDR picture with ph_recoverypoc_cnt equal to 0 for inter prediction reference.
4) In one example, a new SEI message, e.g., named type 2 DRAP indication SEI message, and each picture associated with this new SEI message is referred to as a special type of picture, e.g., type DRAP picture.
5) In one example, it is specified that Type 1 DRAP pictures (associated with a DRAP indication SEI message) and type 2 DRAP pictures (associated with type 2 DRAP indication SEI message) are collectively referred to as DRAP pictures.
6) In one example, the type 2 DRAP indication SEI message includes a RAP picture ID, e.g., denoted as RapPicId, to specify the identifier of a RAP picture, which can be either an IRAP picture or a DRAP picture, and a syntax element (e.g., t2drap_num_ref_rappics_minus1) indicating the number of IRAP or DRAP pictures that are within the same CLVS as the type 2 DRAP picture and may be included in the active entries of the reference picture lists of the type 2 DRAP picture.
   a. In one example, the syntax element (e.g., t2drap_num_ref_rappics_minus1) indicating the number is coded using 3 bits as u(3).
   b. Alternatively, the syntax element (e.g., t2drap_num_ref_rappics_minus1) indicating the number is coded as ue(v).
7) In one example, for the RAP picture ID, of the DRAP picture, in the DRAP indication SEI message or the type 2 DRAP indication SEI message, one or more of the following approaches apply:
   a. In one example, the syntax element for signalling of the RAP picture ID is coded using 16 bits, as u(16).
      i. Alternatively, the syntax element for signalling of the RAP picture ID is coded using ue(v).
   b. In one example, instead of signalling a RAP picture ID in a DRAP indication SEI message, the POC value of the DRAP picture is signalled, e.g., using se(v) or i(32).
      i. Alternatively, the POC delta, relative to the POC value of the associated IRAP picture, is signalled, e.g., using ue(v) or u(16).
8) In one example, it is specified that each IRAP or DRAP picture that is an IRAP or DRAP is associated with a RAP picture ID RapPicId.
   a. In one example, it is specified that the value of RapPicId for an IRAP picture is inferred to be equal to 0.
   b. In one example, it is specified that the values of RapPicId shall be different for any two IRAP or DRAP pictures within a CLVS.
   c. In one example, furthermore, the values of RapPicId for IRAP and DRAP pictures within a CLVS shall be increasing in increasing decoding order of the IRAP or DRAP pictures.

d. In one example, furthermore, the RapPicId of a DRAP picture shall be 1 greater than the RapPicId of the previous IRAP or DRAP picture in decoding order within the same CLVS.

9) In one example, the type 2 DRAP indication SEI message further includes a list of RAP picture IDs, one for each of the IRAP or DRAP pictures that are within the same CLVS as the type 2 DRAP picture and may be included in the active entries of the reference picture lists of the type 2 DRAP picture.
   a. In an example, each of the list of RAP picture IDs is coded the same as the RAP picture ID for the DRAP picture associated with the type 2 DRAP indication SEI message.
   b. Alternatively, require the values of the list of RAP picture IDs to be increasing in increasing order of the values of the list index i, and use ue(v) coding of the delta between the RapPicId value of the i-th DRAP pic and 1) the RapPicId value of the (i−1)-th DRAP or IRAP pic (when i is greater than 0) or 2) 0 (when i is equal to 0).
   c. Alternatively, each of the list of RAP picture IDs is coded to represent the POC value of the RAP picture, e.g., coded as se(v) or i(32).
   d. Alternatively, each of the list of RAP picture IDs is coded to represent the POC delta, relative to the POC value of the associated IRAP picture, is signalled, e.g., using ue(v), u(16).
   e. Alternatively, each of the list of RAP picture IDs is coded to represent the POC delta, e.g., using ue(v) or u(16), between the POC value of the current picture relative to 1) the POC value of the (i−1)-th DRAP or IRAP pic (when i is greater than 0), or 2) the POC value of the IRAP picture (when i is equal to 0).
   f. Alternatively, furthermore, it is required that for any two values of list index values i and j, to the list of RAP picture IDs, when i is less than j, the i-th IRAP or DRAP picture shall precede the j-th IRAP or DRAP picture in decoding order.

6. EMBODIMENTS

Below are some example embodiments for some of the invention aspects summarized above in Section 5, which can be applied to the VSEI specification. The changed texts are based on the latest VSEI text in JVET-S2007-v7. Most relevant parts that have been added or modified are highlighted in bold and Italic, and some of the deleted parts are marked with double brackets (e.g., [[a]] denotes deletion of the character, 'a'). There may be some other changes that are editorial in nature and thus not highlighted.

6.1. First Embodiment

This embodiment is for changes to the existing DRAP indication SEI message.

6.1.1. Dependent Random Access Point Indication SEI Message Syntax

| dependent_rap_indication( payloadSize ) { | Descriptor |
|---|---|
|   if( more_data_in_payload( ) ) | |
|     if( payload_extension_present( ) ) | |
|       *drap_rap_id_in_clvs* | *u(16)* |
| } | |

6.1.2. Dependent Random Access Point Indication SEI Message Semantics

The picture associated with a dependent random access point (DRAP) indication SEI message is referred to as a type 1 DRAP picture.

*Type 1 DRAP pictures and type 2 DRAP pictures (associated with a type 2 DRAP indication SEI message) are collectively referred to as DRAP pictures.*

The presence of the DRAP indication SEI message indicates that the constraints on picture order and picture referencing specified in this subclause apply. These constraints can enable a decoder to properly decode the *type 1* DRAP picture and the pictures that are *in the same layer and* follow it in both decoding order and output order without needing to decode any other pictures *in the same layer* except the associated IRAP picture of the *type 1* DRAP picture. The constraints indicated by the presence of the DRAP indication SEI message, which shall all apply, are as follows:

The *type 1* DRAP picture is a trailing picture.

The *type 1* DRAP picture has a temporal sublayer identifier equal to 0.

The *type 1* DRAP picture does not include any pictures *in the same layer* in the active entries of its reference picture lists except the associated IRAP picture of the *type 1* DRAP picture.

Any picture that *is in the same layer and* follows the *type 1* DRAP picture in both decoding order and output order does not include, in the active entries of its reference picture lists, any picture that *is in the same layer* and precedes the *type 1* DRAP picture in decoding order or output order, with the exception of the associated IRAP picture of the *type 1* DRAP picture.

*drap_rap_id_in_clvs specifies the RAP picture ID, denoted as RapPicId, of the type 1 DRAP picture.*

*Each IRAP or DRAP picture that is an IRAP or DRAP is associated with a RapPicId. The value of RapPicId for an IRAP picture is inferred to be equal to 0. The values of RapPicId shall be different for any two IRAP or DRAP pictures within a CLVS.*

6.2. First Embodiment

This embodiment is for the new type 2 DRAP indication SEI message.

6.2.1. Type 2 DRAP Indication SEI Message Syntax

| type2_drap_indication( payloadSize ) { | Descriptor |
|---|---|
|   t2drap_rap_id_in_clvs | u(16) |
|   t2drap_reserved_zero_13bits | u(13) |
|   t2drap_num_ref_rap_pics_minus1 | u(3) |
|   for( i = 0; i <= t2drap_num_ref_rap_pics_minus1; i++) | |
|     t2drap_ref_rap_id[ i ] | u(16) |
| } | |

6.2.2. Type 2 DRAP Indication SEI Message Semantics

The picture associated with a type 2 DRAP indication SEI message is referred to as a type 2 DRAP picture. Type 1 DRAP pictures (associated with a DRAP indication SEI message) and type 2 DRAP pictures are collectively referred to as DRAP pictures.

The presence of the type 2 DRAP indication SEI message indicates that the constraints on picture order and picture referencing specified in this subclause apply. These constraints can enable a decoder to properly decode the type 2 DRAP picture and the pictures that are in the same layer and follow it in both decoding order and output order without needing to decode any other pictures in the same layer except the list of pictures referenceablePictures, which consists of the list of IRAP or DRAP pictures in decoding order that are within the same CLVS and identified by the t2drap_ref_rap_id[i] syntax elements.

The constraints indicated by the presence of the type 2 DRAP indication SEI message, which shall all apply, are as follows:

The type 2 DRAP picture is a trailing picture.

The type 2 DRAP picture has a temporal sublayer identifier equal to 0.

The type 2 DRAP picture does not include any pictures in the same layer in the active entries of its reference picture lists except the referenceablePictures.

Any picture that is in the same layer and follows the type 2 DRAP picture in both decoding order and output order does not include, in the active entries of its reference picture lists, any picture that is in the same layer and precedes the type 2 DRAP picture in decoding order or output order, with the exception of the referenceablePictures.

Any picture in the list referenceablePictures does not include, in the active entries of its reference picture lists, any picture that is in the same layer and is not a picture at an earlier position in the list referenceablePictures.

NOTE—Consequenhy, the first picture in referenceablePictures, even when it is a DRAP picture instead of an IRAP picture, does not include any picture from the same layer in the active entries of its reference picture lists.

t2drap_rap_id_in_clvs specifies the RAP picture identifier, denoted as RapPicId, of the type 2 DRAP picture. Each IRAP or DRAP picture that is an IRAP or DRAP is associated with a RapPicId. The value of RapPicId for an IRAP picture is inferred to be equal to 0. The values of RapPicId shall be different for any two IRAP or DRAP pictures within a CLVS.

t2drap_reserved_zero_13 bits shall be equal to 0 in bitstreams conforming to this version of this Specification. Other values for t2drap_reserved_zero_13 bits are reserved for future use by ITU-T ISO/IEC. Decoders shall ignore the value of t2drap_reserved_zero_13 bits.

t2drap_num_ref_rap_pics_minus1 plus 1 indicates the number of IRAP or DRAP pictures that are within the same CLVS as the type 2 DRAP picture and may be included in the active entries of the reference picture lists of the type 2 DRAP picture.

t2drap_ref_rap_id[i] indicates RapPicId of the i-th IRAP or DRAP picture that is within the same CLVS as the type 2 DRAP picture and may be included in the active entries of the reference picture lists of the type 2 DRAP picture.

FIG. 1 is a block diagram showing an example video processing system 1900 in which various techniques disclosed herein may be implemented. Various implementations may include some or all of the components of the system 1900. The system 1900 may include input 1902 for receiving video content. The video content may be received in a raw or uncompressed format, e.g., 8 or 10 bit multi-component pixel values, or may be in a compressed or encoded format. The input 1902 may represent a network interface, a peripheral bus interface, or a storage interface. Examples of network interface include wired interfaces such as Ethernet, passive optical network (PON), etc. and wireless interfaces such as Wi-Fi or cellular interfaces.

The system 1900 may include a coding component 1904 that may implement the various coding or encoding methods described in the present document. The coding component 1904 may reduce the average bitrate of video from the input 1902 to the output of the coding component 1904 to produce a coded representation of the video. The coding techniques are therefore sometimes called video compression or video transcoding techniques. The output of the coding component 1904 may be either stored, or transmitted via a communication connected, as represented by the component 1906. The stored or communicated bitstream (or coded) representation of the video received at the input 1902 may be used by the component 1908 for generating pixel values or displayable video that is sent to a display interface 1910. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include SATA (serial advanced technology attachment), PCI, IDE interface, and the like. The techniques described in the present document may be embodied in various electronic devices such as mobile phones, laptops, smartphones or other devices that are capable of performing digital data processing and/or video display.

Figure 2:
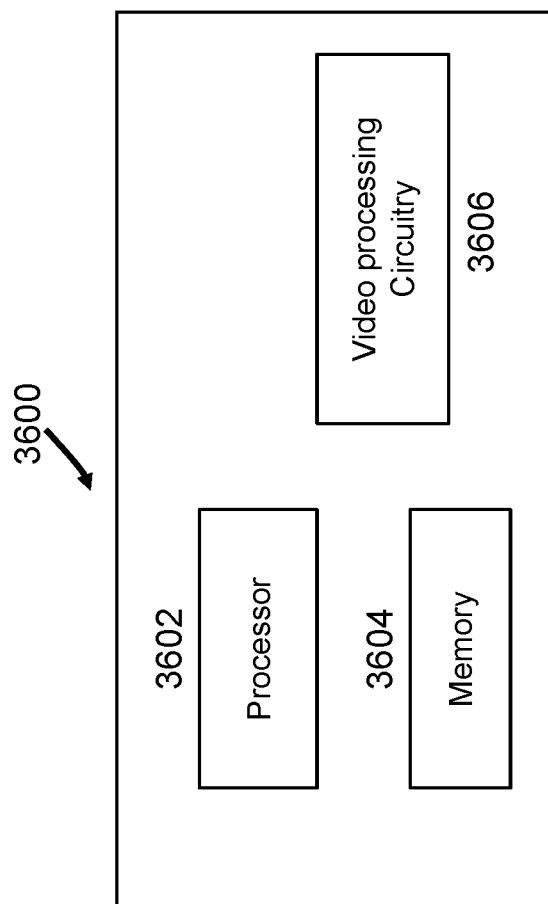
FIG. 2 is a block diagram of a video processing apparatus.

FIG. 2 is a block diagram of a video processing apparatus 3600. The apparatus 3600 may be used to implement one or more of the methods described herein. The apparatus 3600 may be embodied in a smartphone, tablet, computer, Internet of Things (IoT) receiver, and so on. The apparatus 3600 may include one or more processors 3602, one or more memories 3604 and video processing hardware 3606. The processor(s) 3602 may be configured to implement one or more methods described in the present document. The memory (memories) 3604 may be used for storing data and code used for implementing the methods and techniques described herein. The video processing hardware 3606 may be used to implement, in hardware circuitry, some techniques described in the present document. In some embodiments, the video processing hardware 3606 may be at least partly included in the processor 3602, e.g., a graphics co-processor.

Figure 4:
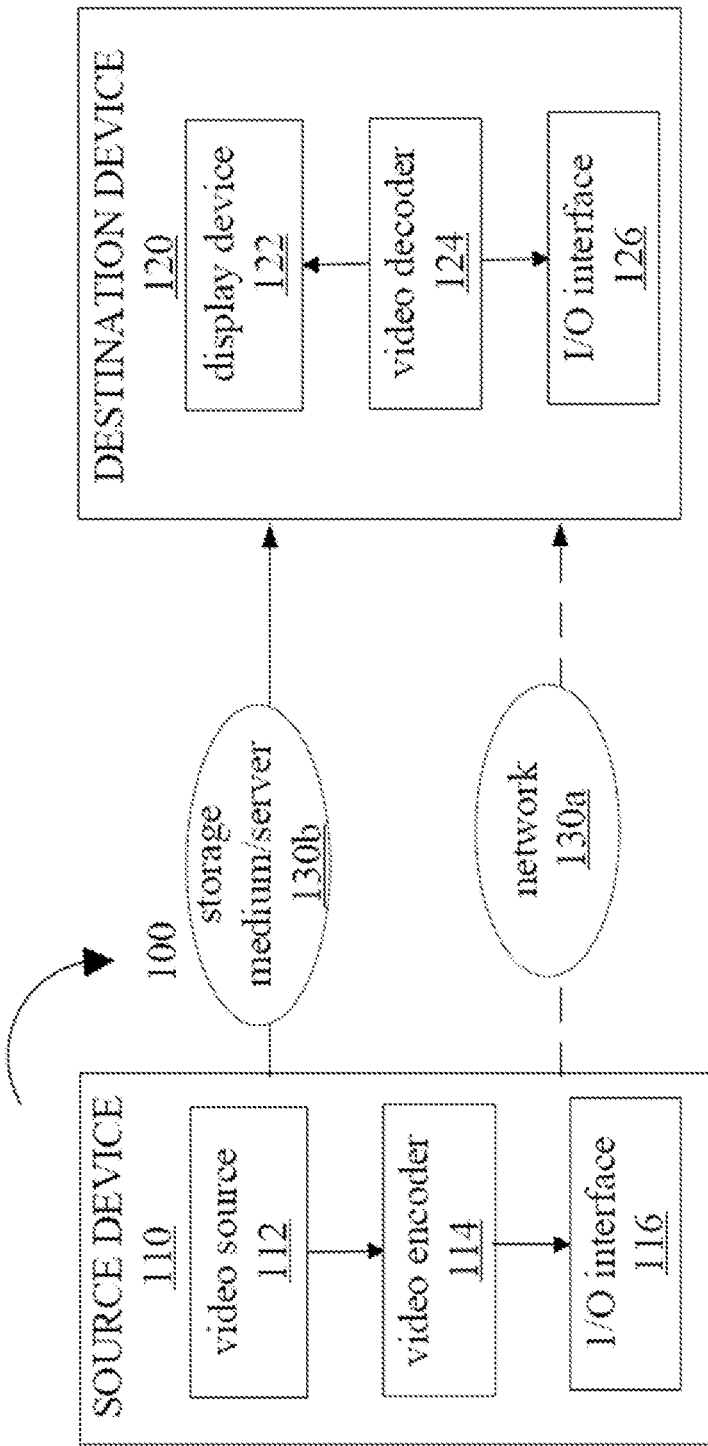
FIG. 4 is a block diagram that illustrates a video coding system in accordance with some embodiments of the present disclosure.

FIG. 4 is a block diagram that illustrates an example video coding system 100 that may utilize the techniques of this disclosure.

As shown in FIG. 4, video coding system 100 may include a source device 110 and a destination device 120. Source device 110 generates encoded video data which may be referred to as a video encoding device. Destination device 120 may decode the encoded video data generated by source device 110 which may be referred to as a video decoding device.

Source device 110 may include a video source 112, a video encoder 114, and an input/output (I/O) interface 116.

Video source 112 may include a source such as a video capture device, an interface to receive video data from a video content provider, and/or a computer graphics system for generating video data, or a combination of such sources. The video data may comprise one or more pictures. Video encoder 114 encodes the video data from video source 112 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. I/O interface 116 may include a modulator/demodulator (modem) and/or a transmitter. The encoded video data may be transmitted directly to destination device 120 via I/O interface 116 through network 130a. The encoded video data may also be stored onto a storage medium/server 130b for access by destination device 120.

Destination device 120 may include an I/O interface 126, a video decoder 124, and a display device 122.

I/O interface 126 may include a receiver and/or a modem. I/O interface 126 may acquire encoded video data from the source device 110 or the storage medium/server 130b. Video decoder 124 may decode the encoded video data. Display device 122 may display the decoded video data to a user. Display device 122 may be integrated with the destination device 120, or may be external to destination device 120 which be configured to interface with an external display device.

Video encoder 114 and video decoder 124 may operate according to a video compression standard, such as the High Efficiency Video Coding (HEVC) standard, Versatile Video Coding (VVM) standard and other current and/or further standards.

Figure 5:
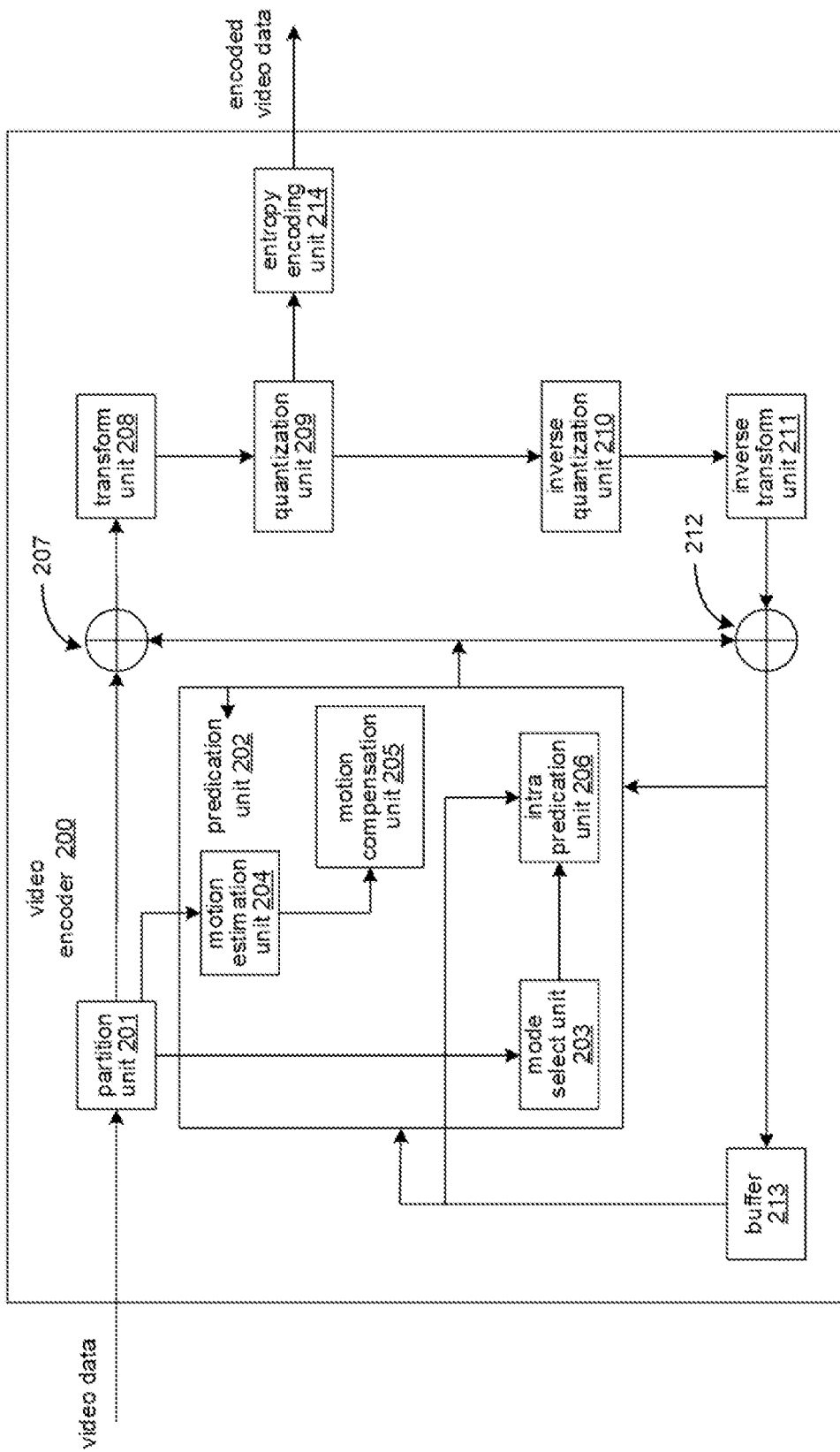
FIG. 5 is a block diagram that illustrates an encoder in accordance with some embodiments of the present disclosure.

FIG. 5 is a block diagram illustrating an example of video encoder 200, which may be video encoder 114 in the system 100 illustrated in FIG. 4.

Video encoder 200 may be configured to perform any or all of the techniques of this disclosure. In the example of FIG. 5, video encoder 200 includes a plurality of functional components. The techniques described in this disclosure may be shared among the various components of video encoder 200. In some examples, a processor may be configured to perform any or all of the techniques described in this disclosure.

The functional components of video encoder 200 may include a partition unit 201, a predication unit 202 which may include a mode select unit 203, a motion estimation unit 204, a motion compensation unit 205 and an intra prediction unit 206, a residual generation unit 207, a transform unit 208, a quantization unit 209, an inverse quantization unit 210, an inverse transform unit 211, a reconstruction unit 212, a buffer 213, and an entropy encoding unit 214.

In other examples, video encoder 200 may include more, fewer, or different functional components. In an example, predication unit 202 may include an intra block copy (IBC) unit. The IBC unit may perform predication in an IBC mode in which at least one reference picture is a picture where the current video block is located.

Furthermore, some components, such as motion estimation unit 204 and motion compensation unit 205 may be highly integrated, but are represented in the example of FIG. 5 separately for purposes of explanation.

Partition unit 201 may partition a picture into one or more video blocks. Video encoder 200 and video decoder 300 may support various video block sizes.

Mode select unit 203 may select one of the coding modes, intra or inter, e.g., based on error results, and provide the resulting intra- or inter-coded block to a residual generation unit 207 to generate residual block data and to a reconstruction unit 212 to reconstruct the encoded block for use as a reference picture. In some example, Mode select unit 203 may select a combination of intra and inter predication (CIIP) mode in which the predication is based on an inter predication signal and an intra predication signal. Mode select unit 203 may also select a resolution for a motion vector (e.g., a sub-pixel or integer pixel precision) for the block in the case of inter-predication.

To perform inter prediction on a current video block, motion estimation unit 204 may generate motion information for the current video block by comparing one or more reference frames from buffer 213 to the current video block. Motion compensation unit 205 may determine a predicted video block for the current video block based on the motion information and decoded samples of pictures from buffer 213 other than the picture associated with the current video block.

Motion estimation unit 204 and motion compensation unit 205 may perform different operations for a current video block, for example, depending on whether the current video block is in an I slice, a P slice, or a B slice.

In some examples, motion estimation unit 204 may perform uni-directional prediction for the current video block, and motion estimation unit 204 may search reference pictures of list 0 or list 1 for a reference video block for the current video block. Motion estimation unit 204 may then generate a reference index that indicates the reference picture in list 0 or list 1 that contains the reference video block and a motion vector that indicates a spatial displacement between the current video block and the reference video block. Motion estimation unit 204 may output the reference index, a prediction direction indicator, and the motion vector as the motion information of the current video block. Motion compensation unit 205 may generate the predicted video block of the current block based on the reference video block indicated by the motion information of the current video block.

In other examples, motion estimation unit 204 may perform bi-directional prediction for the current video block, motion estimation unit 204 may search the reference pictures in list 0 for a reference video block for the current video block and may also search the reference pictures in list 1 for another reference video block for the current video block. Motion estimation unit 204 may then generate reference indexes that indicate the reference pictures in list 0 and list 1 containing the reference video blocks and motion vectors that indicate spatial displacements between the reference video blocks and the current video block. Motion estimation unit 204 may output the reference indexes and the motion vectors of the current video block as the motion information of the current video block. Motion compensation unit 205 may generate the predicted video block of the current video block based on the reference video blocks indicated by the motion information of the current video block.

In some examples, motion estimation unit 204 may output a full set of motion information for decoding processing of a decoder.

In some examples, motion estimation unit 204 may do not output a full set of motion information for the current video. Rather, motion estimation unit 204 may signal the motion information of the current video block with reference to the motion information of another video block. For example, motion estimation unit 204 may determine that the motion information of the current video block is sufficiently similar to the motion information of a neighboring video block.

In one example, motion estimation unit 204 may indicate, in a syntax structure associated with the current video block, a value that indicates to the video decoder 300 that the current video block has the same motion information as another video block.

In another example, motion estimation unit 204 may identify, in a syntax structure associated with the current video block, another video block and a motion vector difference (MVD). The motion vector difference indicates a difference between the motion vector of the current video block and the motion vector of the indicated video block. The video decoder 300 may use the motion vector of the indicated video block and the motion vector difference to determine the motion vector of the current video block.

As discussed above, video encoder 200 may predictively signal the motion vector. Two examples of predictive signaling techniques that may be implemented by video encoder 200 include advanced motion vector predication (AMVP) and merge mode signaling.

Intra prediction unit 206 may perform intra prediction on the current video block. When intra prediction unit 206 performs intra prediction on the current video block, intra prediction unit 206 may generate prediction data for the current video block based on decoded samples of other video blocks in the same picture. The prediction data for the current video block may include a predicted video block and various syntax elements.

Residual generation unit 207 may generate residual data for the current video block by subtracting (e.g., indicated by the minus sign) the predicted video block(s) of the current video block from the current video block. The residual data of the current video block may include residual video blocks that correspond to different sample components of the samples in the current video block.

In other examples, there may be no residual data for the current video block for the current video block, for example in a skip mode, and residual generation unit 207 may not perform the subtracting operation.

Transform processing unit 208 may generate one or more transform coefficient video blocks for the current video block by applying one or more transforms to a residual video block associated with the current video block.

After transform processing unit 208 generates a transform coefficient video block associated with the current video block, quantization unit 209 may quantize the transform coefficient video block associated with the current video block based on one or more quantization parameter (QP) values associated with the current video block.

Inverse quantization unit 210 and inverse transform unit 211 may apply inverse quantization and inverse transforms to the transform coefficient video block, respectively, to reconstruct a residual video block from the transform coefficient video block. Reconstruction unit 212 may add the reconstructed residual video block to corresponding samples from one or more predicted video blocks generated by the predication unit 202 to produce a reconstructed video block associated with the current block for storage in the buffer 213.

After reconstruction unit 212 reconstructs the video block, loop filtering operation may be performed reduce video blocking artifacts in the video block.

Entropy encoding unit 214 may receive data from other functional components of the video encoder 200. When entropy encoding unit 214 receives the data, entropy encoding unit 214 may perform one or more entropy encoding operations to generate entropy encoded data and output a bitstream that includes the entropy encoded data.

Figure 6:
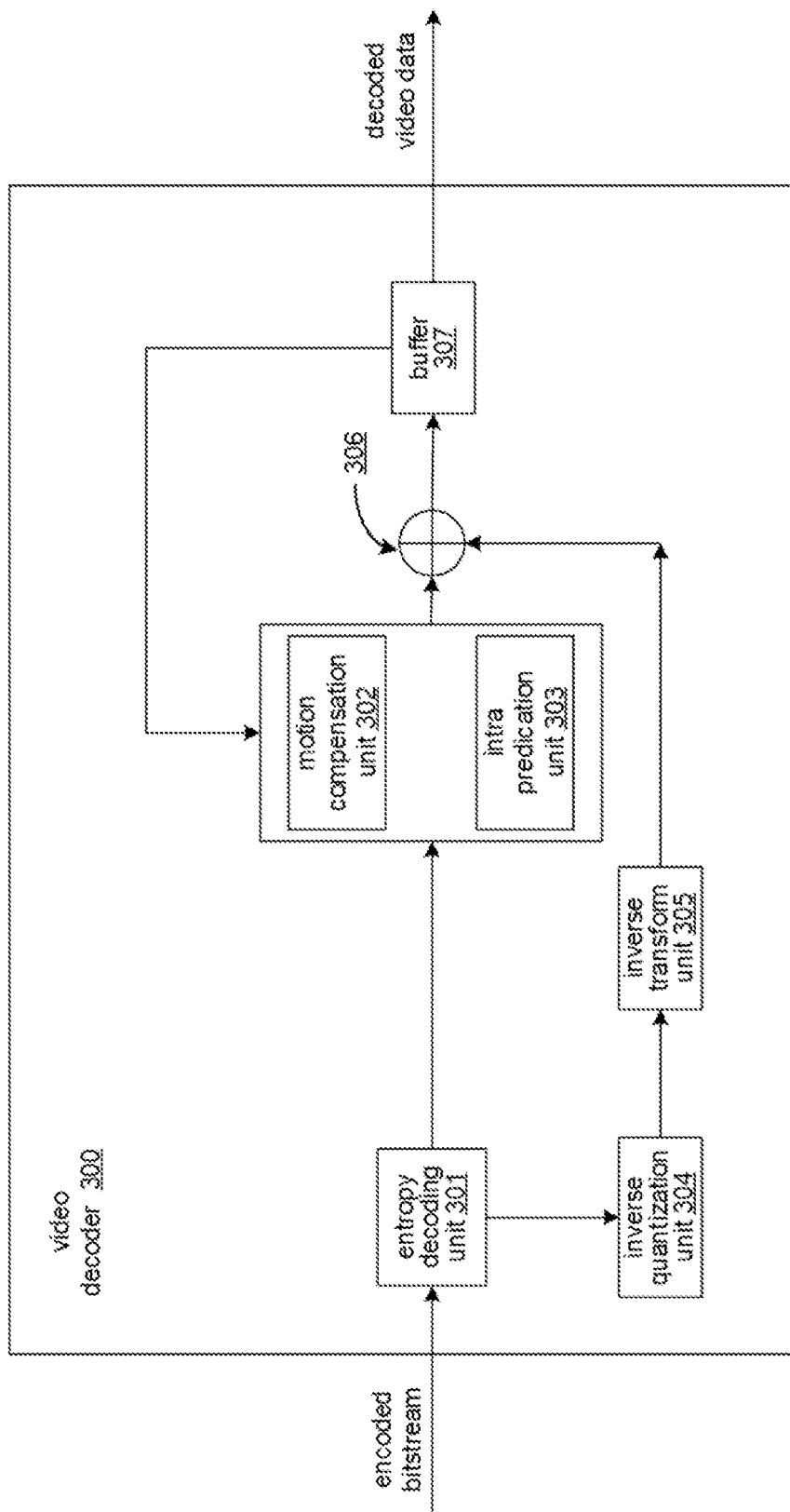
FIG. 6 is a block diagram that illustrates a decoder in accordance with some embodiments of the present disclosure.

FIG. 6 is a block diagram illustrating an example of video decoder 300 which may be video decoder 114 in the system 100 illustrated in FIG. 4.

The video decoder 300 may be configured to perform any or all of the techniques of this disclosure. In the example of FIG. 6, the video decoder 300 includes a plurality of functional components. The techniques described in this disclosure may be shared among the various components of the video decoder 300. In some examples, a processor may be configured to perform any or all of the techniques described in this disclosure.

In the example of FIG. 6, video decoder 300 includes an entropy decoding unit 301, a motion compensation unit 302, an intra prediction unit 303, an inverse quantization unit 304, an inverse transformation unit 305, and a reconstruction unit 306 and a buffer 307. Video decoder 300 may, in some examples, perform a decoding pass generally reciprocal to the encoding pass described with respect to video encoder 200 (FIG. 5).

Entropy decoding unit 301 may retrieve an encoded bitstream. The encoded bitstream may include entropy coded video data (e.g., encoded blocks of video data). Entropy decoding unit 301 may decode the entropy coded video data, and from the entropy decoded video data, motion compensation unit 302 may determine motion information including motion vectors, motion vector precision, reference picture list indexes, and other motion information. Motion compensation unit 302 may, for example, determine such information by performing the AMVP and merge mode.

Motion compensation unit 302 may produce motion compensated blocks, possibly performing interpolation based on interpolation filters. Identifiers for interpolation filters to be used with sub-pixel precision may be included in the syntax elements.

Motion compensation unit 302 may use interpolation filters as used by video encoder 200 during encoding of the video block to calculate interpolated values for sub-integer pixels of a reference block. Motion compensation unit 302 may determine the interpolation filters used by video encoder 200 according to received syntax information and use the interpolation filters to produce predictive blocks.

Motion compensation unit 302 may uses some of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter-encoded block, and other information to decode the encoded video sequence.

Intra prediction unit 303 may use intra prediction modes for example received in the bitstream to form a prediction block from spatially adjacent blocks. Inverse quantization unit 303 inverse quantizes, i.e., de-quantizes, the quantized video block coefficients provided in the bitstream and decoded by entropy decoding unit 301. Inverse transform unit 303 applies an inverse transform.

Reconstruction unit 306 may sum the residual blocks with the corresponding prediction blocks generated by motion compensation unit 202 or intra-prediction unit 303 to form decoded blocks. If desired, a deblocking filter may also be applied to filter the decoded blocks in order to remove blockiness artifacts. The decoded video blocks are then stored in buffer 307, which provides reference blocks for subsequent motion compensation/intra predication and also produces decoded video for presentation on a display device.

A listing of solutions preferred by some embodiments is provided next.

A first set of solutions is provided below. The following solutions show example embodiments of techniques discussed in the previous section (e.g., item 1).

Figure 3:
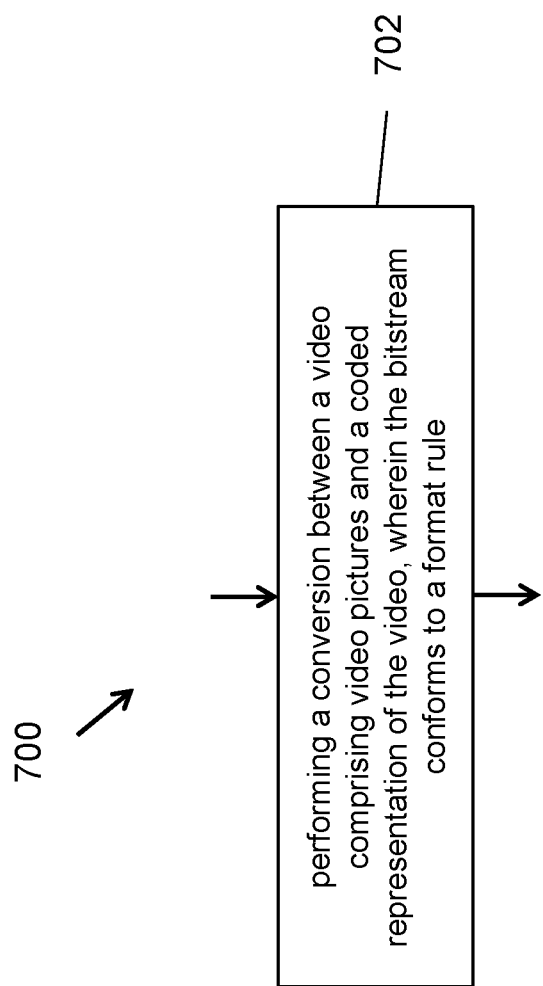
FIG. 3 is a flowchart for an example method of video processing.

1. A method of video processing (e.g., method 700 depicted in FIG. 3), comprising: performing (702) a conversion between a video comprising multiple layers and a coded representation of the video, wherein the coded representation is organized according to a format rule; wherein the format rule specifies that supplemental enhancement information (SEI) is included in the coded representation, wherein the SEI information carries information that is sufficient for a decoder to decode a dependent random access point (DRAP) picture and/or decode pictures in a layer in a decoding order and an output order without a need to decode other pictures in the layer except for an intra rando access picture (IRAP) of the DRAP picture.
2. The method of solution 1, wherein the DRAP picture excludes any pictures in the layer from a reference picture list with exception of the IRAP.

The following solutions show example embodiments of techniques discussed in the previous section (e.g., item 2).

3. A method of video processing, comprising: performing a conversion between a video comprising multiple layers and a coded representation of the video, wherein the coded representation is organized according to a format rule; wherein the format rule specifies that a supplemental enhancement information (SEI) message is included in the coded representation for a dependent random access point (DRAP) picture, wherein the SEI message includes an identifier of a random access point (RAP) picture.
4. The method of solution 3, wherein the RAP is an intra random access picture.
5. The method of solution 3, wherein the RAP is a dependent random access picture (DRAP).

The following solutions show preferred example embodiments of techniques discussed in the previous section (e.g., item 3).

6. The method of solution 5, wherein the DRAP picture is allowed to refer to an associated intra random access picture or a previous picture in a decoding order that is a gradual decoding refresh picture.

The following solutions show example embodiments of techniques discussed in the previous section (e.g., item 4-6).

7. A method of video processing, comprising: performing a conversion between a video comprising multiple layers and a coded representation of the video, wherein the coded representation is organized according to a format rule; wherein the format rule specifies whether and how a type 2 supplemental enhancement information (SEI) message that refers to a dependent random access picture (DRAP) is included in the coded representation.
8. The method of solution 7, wherein the format rule specifies that the type 2 SEI message and each picture associated with the message is handled as a special type of picture.
9. The method of solution 7, wherein the format rule specifies that the type 2 SEI message includes an identifier for a random access picture (RAP), called a type 2 RAP picture, and a syntax element that indicates a number of pictures that are in a same coded video layer as the random access picture such that the pictures are includes in an active reference picture list of the type 2 RAP picture.
10. The method of any of solutions 1-9, wherein the conversion comprises generating a coded representation from the video.
11. The method of any of solutions 1-9, wherein the conversion comprises decoding the coded representation to generate the video.
12. A video decoding apparatus comprising a processor configured to implement a method recited in one or more of solutions 1 to 11.
13. A video encoding apparatus comprising a processor configured to implement a method recited in one or more of solutions 1 to 11.
14. A computer program product having computer code stored thereon, the code, when executed by a processor, causes the processor to implement a method recited in any of solutions 1 to 11.
15. A computer readable medium that stores a coded representation generated according to any of solutions 1 to 11.
16. A method, apparatus or system described in the present document.

A second set of preferred solutions provides example embodiments of techniques discussed in the previous section (e.g., items 1, 1.a, 1.b, 2, 2.a, 3).

Figure 7:
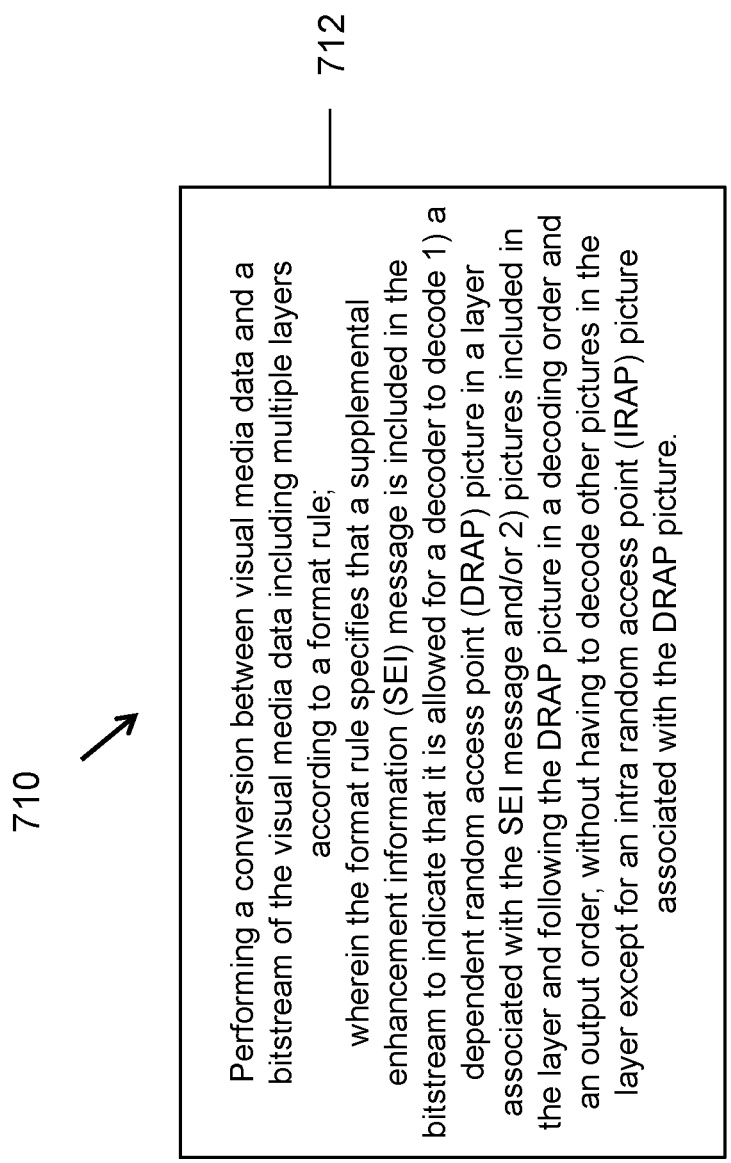
FIGS. 7 to 9 are flowcharts for an example method of processing visual media data based on some implementations of the disclosed technology.

1. A method of processing visual media data (e.g., method 710 as shown in FIG. 7), comprising: performing 712 a conversion between visual media data and a bitstream of the visual media data including multiple layers according to a format rule; wherein the format rule specifies that a supplemental enhancement information (SEI) message is included in the bitstream to indicate that it is allowed for a decoder to decode 1) a dependent random access point (DRAP) picture in a layer associated with the SEI message and/or 2) pictures included in the layer and following the DRAP picture in a decoding order and an output order, without having to decode other pictures in the layer except for an intra random access point (IRAP) picture associated with the DRAP picture.
2. The method of solution 1, wherein the DRAP picture excludes a picture in the layer from active entries of a reference picture list of the DRAP picture with an exception of the IRAP picture.
3. The method of solution 1, wherein a first picture included in the layer and following the DRAP picture in the decoding order and the output order excludes, from active entries of a reference picture list of the first picture, a second picture included in the layer and preceding the DRAP picture in the decoding order and the output order with an exception of the IRAP picture.
4. The method of solution 1, wherein the format rule further specifies that the SEI message includes an identifier of a random access point (RAP) picture.
5. The method of solution 4, wherein the RAP picture is the IRAP picture or the DRAP picture.
6. The method of solution 4, wherein the format rule further specifies that a presence flag indicating a presence of the identifier of the RAP picture in the SEI message is included in the bitstream.
7. The method of solution 6, wherein the presence flag with a value equal to a first value indicates that the identifier of the RAP picture is present in the SEI message.

8. The method of solution 6, wherein the presence flag with a value equal to a second value indicates that the identifier of the RAP picture is omitted from the SEI message.
9. The method of solution 1, wherein the DRAP picture is allowed to refer to the IRAP picture or a previous picture in a decoding order that is a gradual decoding refresh (GDR) picture with a recovery point of its decoded picture in an output order equal to 0.
10. The method of any one of solutions 1 to 9, wherein the bitstream is a versatile video coding bitstream.
11. The method of any one of solutions 1 to 10, wherein the performing of the conversion includes generating the bitstream from the visual media data.
12. The method of any one of solutions 1 to 10, wherein the performing of the conversion includes reconstructing the visual media data from the bitstream.
13. An apparatus for processing visual media data comprising a processor and a non-transitory memory with instructions thereon, wherein the instructions upon execution by the processor, cause the processor to: perform a conversion between visual media data and a bitstream of the visual media data including multiple layers according to a format rule; wherein the format rule specifies that a supplemental enhancement information (SEI) message is included in the bitstream to indicate that it is allowed for a decoder to decode 1) a dependent random access point (DRAP) picture in a layer associated with the SEI message and/or 2) pictures included in the layer and following the DRAP picture in a decoding order and an output order, without having to decode other pictures in the layer except for an intra random access point (IRAP) picture associated with the DRAP picture.
14. The apparatus of solution 13, wherein the DRAP picture excludes a picture in the layer from active entries of a reference picture list of the DRAP picture with an exception of the IRAP picture.
15. The apparatus of solution 13, wherein a first picture included in the layer and following the DRAP picture in the decoding order and the output order excludes, from active entries of a reference picture list of the first picture, a second picture included in the layer and preceding the DRAP picture in the decoding order and the output order with an exception of the IRAP picture.
16. The apparatus of solution 13, wherein the bitstream is a versatile video coding bitstream.
17. A non-transitory computer-readable storage medium storing instructions that cause a processor to: perform a conversion between visual media data and a bitstream of the visual media data including multiple layers according to a format rule; wherein the format rule specifies that a supplemental enhancement information (SEI) message is included in the bitstream to indicate that it is allowed for a decoder to decode 1) a dependent random access point (DRAP) picture in a layer associated with the SEI message and/or 2) pictures included in the layer and following the DRAP picture in a decoding order and an output order, without having to decode other pictures in the layer except for an intra random access point (IRAP) picture associated with the DRAP picture.
18. The non-transitory computer-readable recording medium of solution 17, wherein the bitstream is a versatile video coding bitstream.
19. A non-transitory computer-readable recording medium storing a bitstream of a visual media data which is generated by a method performed by a visual media data processing apparatus, wherein the method comprises: determining that a supplemental enhancement information (SEI) message is included in the bitstream to indicate that it is allowed for a decoder to decode 1) a dependent random access point (DRAP) picture in a layer associated with the SEI message and/or 2) pictures included in the layer and following the DRAP picture in a decoding order and an output order, without having to decode other pictures in the layer except for an intra random access point (IRAP) picture associated with the DRAP picture; and generating the bitstream based on the determining.
20. The non-transitory computer-readable recording medium of solution 19, wherein the bitstream is a versatile video coding bitstream.
21. A visual media data processing apparatus comprising a processor configured to implement a method recited in any one or more of solutions 1 to 12.
22. A method of storing a bitstream of visual media data, comprising a method recited in any one of solutions 1 to 12, and further including storing the bitstream to a non-transitory computer-readable recording medium.
23. A computer readable medium storing program code that, when executed, causes a processor to implement a method recited in any one or more of solutions 1 to 12.
24. A computer readable medium that stores a bitstream generated according to any of the above described methods.
25. A visual media data processing apparatus for storing a bitstream, wherein the visual media data processing apparatus is configured to implement a method recited in any one or more of solutions 1 to 12.
26. A computer readable medium on which a bitstream complying to a format rule that is recited according to any of solutions 1 to 12.

A third set of solutions provides preferred example embodiments of techniques discussed in the previous section (e.g., items 4 to 8).

Figure 8:
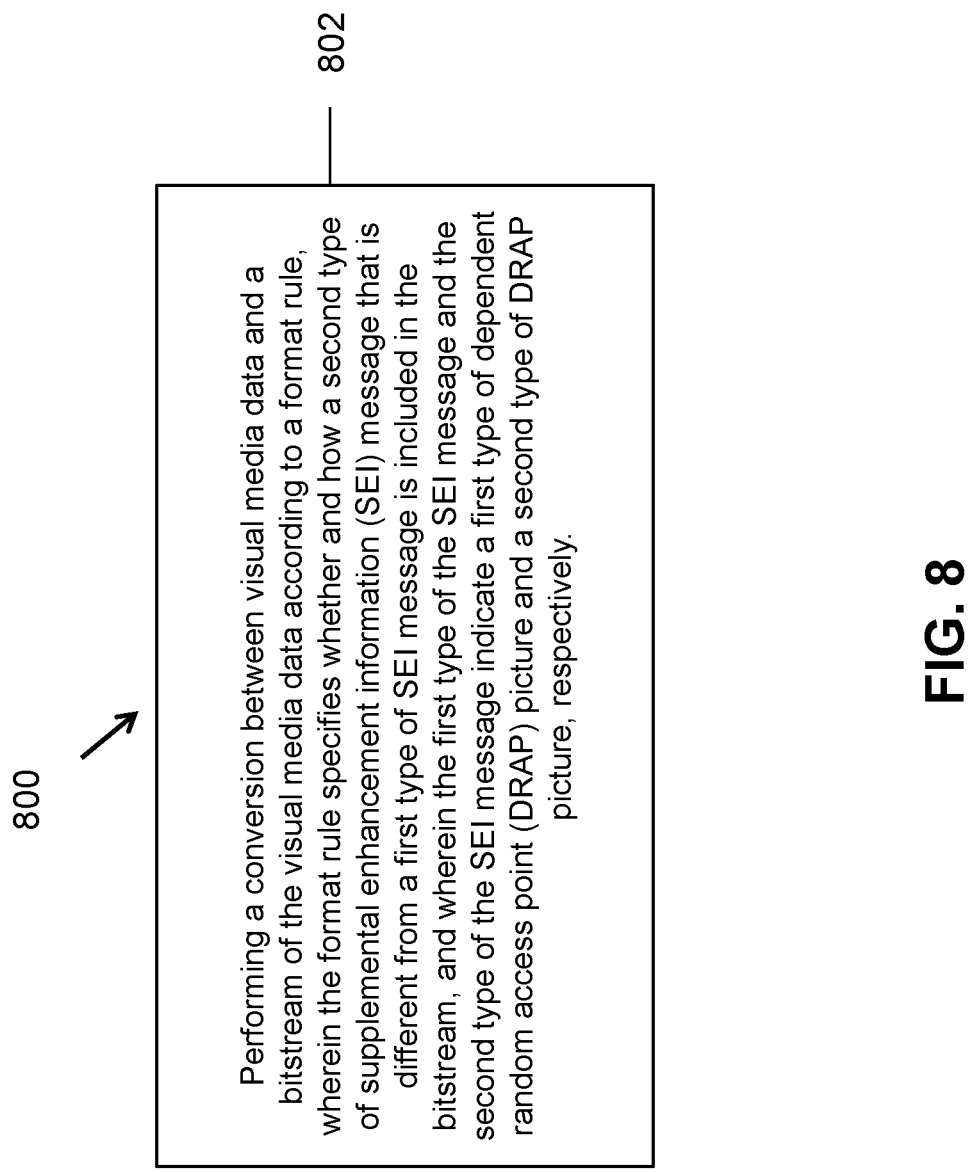

1. A method of processing visual media data (e.g., method 800 as shown in FIG. 8), comprising: performing 802 a conversion between visual media data and a bitstream of the visual media data according to a format rule, wherein the format rule specifies whether and how a second type of supplemental enhancement information (SEI) message that is different from a first type of SEI message is included in the bitstream, and wherein the first type of the SEI message and the second type of the SEI message indicate a first type of dependent random access point (DRAP) picture and a second type of DRAP picture, respectively.
2. The method of solution 1, wherein the format rule further specifies that the second type of the SEI message includes a random access point (RAP) picture identifier.
3. The method of solution 1, wherein, for the first type of the DRAP picture or the second type of the DRAP picture, a random access point (RAP) picture identifier is included in the bitstream.
4. The method of solution 3, wherein the RAP picture identifier is coded as u(16) that is an unsigned integer using 16 bits or as ue(v) that is an unsigned integer using Exponential Golomb codes.
5. The method of solution 1, wherein the format rule further specifies that the first type of SEI message or the second type of the SEI message includes information on a picture order count (POC) value of the first type of the DRAP picture or the second type of the DRAP picture.
6. The method of solution 1, wherein the format rule further specifies that each IRAP picture or DRAP picture is associated with a random access point (RAP) picture identifier.
7. The method of solution 6, wherein the format rule further specifies that a value of the RAP picture identifier for the IRAP picture is inferred to be equal to 0.
8. The method of solution 6, wherein the format rule further specifies that values of RAP picture identifiers for any two IRAP or DRAP pictures within a coded layer video sequence (CLVS) are different from each other.
9. The method of solution 6, wherein the format rule further specifies that values of RAP picture identifiers for IRAP or DRAP pictures within a coded layer video sequence (CLVS) are increasing in an increasing decoding order of the IRAP or DRAP pictures.
10. The method of solution 6, wherein the format rule further specifies that a value of the RAP picture identifier of the DRAP picture is one greater than a value of a previous IRAP or DRAP picture in a decoding order within a coded layer video sequence (CLVS).
11. The method of any one of solutions 1 to 10, wherein the performing of the conversion includes generating the bitstream from the visual media data.
12. The method of any one of solutions 1 to 10, wherein the performing of the conversion includes reconstructing the visual media data from the bitstream.
13. An apparatus for processing visual media data comprising a processor and a non-transitory memory with instructions thereon, wherein the instructions upon execution by the processor, cause the processor to: perform a conversion between visual media data and a bitstream of the visual media data according to a format rule, wherein the format rule specifies whether and how a second type of supplemental enhancement information (SEI) message that is different from a first type of SEI message is included in the bitstream, and wherein the first type of the SEI message and the second type of the SEI message indicate a first type of dependent random access point (DRAP) picture and a second type of DRAP picture, respectively.
14. The apparatus of solution 13, wherein the format rule further specifies that the second type of the SEI message includes a random access point (RAP) picture identifier.
15. The apparatus of solution 13, wherein, for the first type of the DRAP picture or the second type of the DRAP picture, a random access point (RAP) picture identifier is included in the bitstream, the RAP picture identifier is coded as u(16) that is an unsigned integer using 16 bits or as ue(v) that is an unsigned integer using Exponential Golomb codes.
16. The apparatus of solution 13, wherein the format rule further specifies that each IRAP picture or DRAP picture is associated with a random access point (RAP) picture identifier, and the format rule further specifies that a value of the RAP picture identifier for the IRAP picture is inferred to be equal to 0.
17. A non-transitory computer-readable storage medium storing instructions that cause a processor to: perform a conversion between visual media data and a bitstream of the visual media data according to a format rule, wherein the format rule specifies whether and how a second type of supplemental enhancement information (SEI) message that is different from a first type of SEI message is included in the bitstream, and wherein the first type of the SEI message and the second type of the SEI message indicate a first type of dependent random access point (DRAP) picture and a second type of DRAP picture, respectively.
18. The non-transitory computer-readable recording medium of solution 17, wherein the format rule further specifies that the second type of the SEI message includes a random access point (RAP) picture identifier, and wherein, for the first type of the DRAP picture or the second type of the DRAP picture, a random access point (RAP) picture identifier is included in the bitstream, the RAP picture identifier is coded as u(16) that is an unsigned integer using 16 bits or as ue(v) that is an unsigned integer using Exponential Golomb codes, and wherein the format rule further specifies that each IRAP picture or DRAP picture is associated with a random access point (RAP) picture identifier, and the format rule further specifies that a value of the RAP picture identifier for the IRAP picture is inferred to be equal to 0.
19. A non-transitory computer-readable recording medium storing a bitstream of a visual media data which is generated by a method performed by a visual media data processing apparatus, wherein the method comprises determining whether and how a second type of supplemental enhancement information (SEI) message that is different from a first type of SEI message is included in the bitstream; and generating the bitstream based on the determining.
20. The non-transitory computer-readable recording medium of solution 19, wherein the format rule further specifies that the second type of the SEI message includes a random access point (RAP) picture identifier, and wherein, for the first type of the DRAP picture or the second type of the DRAP picture, a random access point (RAP) picture identifier is included in the bitstream, the RAP picture identifier is coded as u(16) that is an unsigned integer using 16 bits or as ue(v) that is an unsigned integer using Exponential Golomb codes, and wherein the format rule further specifies that each IRAP picture or DRAP picture is associated with a random access point (RAP) picture identifier, and the format rule further specifies that a value of the RAP picture identifier for the IRAP picture is inferred to be equal to 0.
21. A visual media data processing apparatus comprising a processor configured to implement a method recited in any one or more of solutions 1 to 12.
22. A method of storing a bitstream of visual media data, comprising a method recited in any one of solutions 1 to 12, and further including storing the bitstream to a non-transitory computer-readable recording medium.
23. A computer readable medium storing program code that, when executed, causes a processor to implement a method recited in any one or more of solutions 1 to 12.
24. A computer readable medium that stores a bitstream generated according to any of the above described methods.
25. A visual media data processing apparatus for storing a bitstream, wherein the video processing apparatus is configured to implement a method recited in any one or more of solutions 1 to 12.

26. A computer readable medium on which a bitstream complying to a format rule that is recited according to any of solutions 1 to 12.

A fourth set of solutions provides preferred example embodiments of techniques discussed in the previous section (e.g., items 6 and 9).

Figure 9:
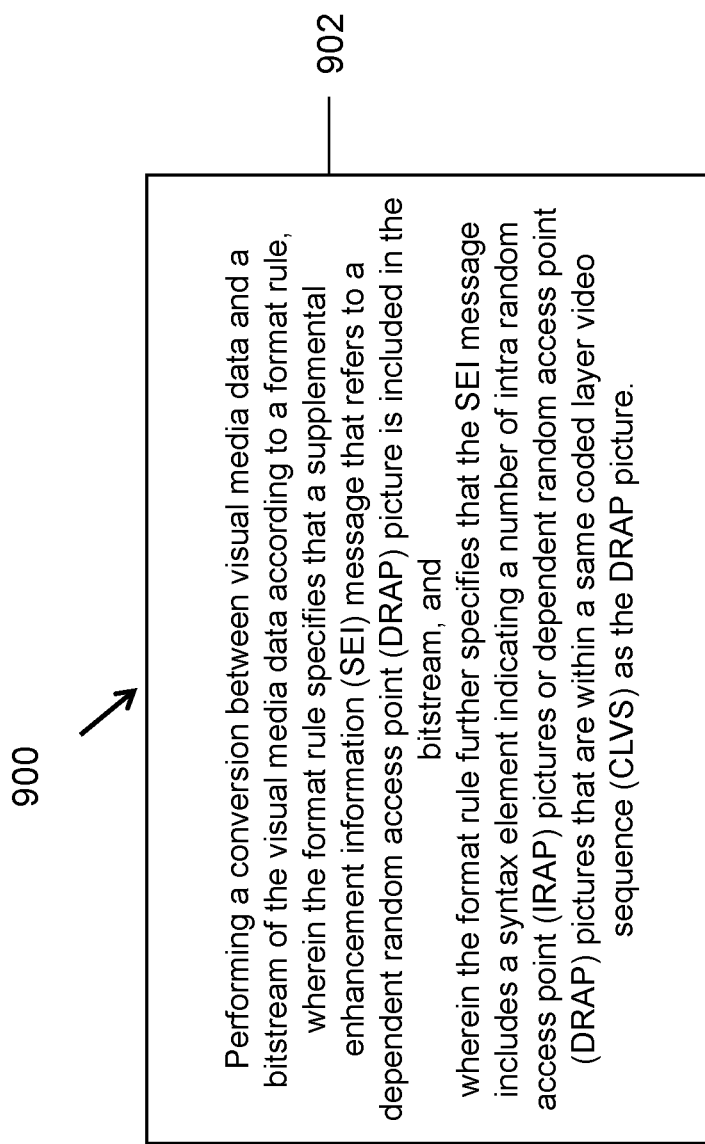

1. A method of processing visual media data (e.g., method 900 as shown in FIG. 9), comprising: performing 902 a conversion between visual media data and a bitstream of the visual media data according to a format rule, wherein the format rule specifies that a supplemental enhancement information (SEI) message that refers to a dependent random access point (DRAP) picture is included in the bitstream, and wherein the format rule further specifies that the SEI message includes a syntax element indicating a number of intra random access point (IRAP) pictures or dependent random access point (DRAP) pictures that are within a same coded layer video sequence (CLVS) as the DRAP picture.
2. The method of solution 1, wherein the IRAP pictures or the DRAP pictures are allowed to be included in active entries of a reference picture list of the DRAP picture.
3. The method of solution 1, wherein the syntax element is coded as u(3) that is an unsigned integer using 3 bits or as ue(v) that is an unsigned integer using Exponential Golomb codes.
4. The method of solution 1, wherein the format rule further specifies that the SEI message further includes a list of random access point (RAP) picture identifiers for the IRAP pictures or the DRAP pictures that are within the same coded layer video sequence (CLVS) as the DRAP picture.
5. The method of solution 4, wherein the IRAP pictures or the DRAP pictures are allowed to be included in active entries of a reference picture list of the DRAP picture.
6. The method of solution 4, wherein each of the list of the RAP picture identifiers is coded the same as a RAP picture identifier for the DRAP picture associated with the SEI message.
7. The method of solution 4, wherein an identifier of the list has a value corresponding to an i-th RAP picture, i being equal to or greater than 0, and wherein values of the RAP picture identifiers increase in an increasing order of a value of i.
8. The method of solution 7, wherein each of the list is coded using ue(v) of a delta between a value of an i-th DRAP picture identifier and 1) a value of (i−1)-th DRAP or IRAP picture identifier, whereby i being greater than 0 or 2) 0, whereby i being equal to 0.
9. The method of solution 4, wherein each of the list is coded to represent a picture order count (POC) value of a RAP picture.
10. The method of solution 4, wherein each of the list is coded to represent a picture order count (POC) delta information that is relative to a POC value of an IRAP picture associated with the SEI message.
11. The method of solution 4, wherein each of the list is coded to represent a picture order count (POC) delta information between a POC value of a current picture and 1) a POC value of a (i−1)-th DRAP or IRAP picture, whereby i being greater than 0, or 2) a POC value of an IRAP picture associated with the SEI message.
12. The method of solution 4, wherein the list includes identifiers corresponding to an i-th RAP picture, a j-th RAP picture, whereby i is less than j, and wherein an i-th RAP picture precedes a j-th RAP picture in a decoding order.
13. The method of any one of solutions 1 to 12, wherein the performing of the conversion includes generating the bitstream from the visual media data.
14. The method of any one of solutions 1 to 12, wherein the performing of the conversion includes reconstructing the visual media data from the bitstream.
15. An apparatus for processing visual media data comprising a processor and a non-transitory memory with instructions thereon, wherein the instructions upon execution by the processor, cause the processor to: perform a conversion between visual media data and a bitstream of the visual media data according to a format rule, wherein the format rule specifies that a supplemental enhancement information (SEI) message that refers to a dependent random access point (DRAP) picture is included in the bitstream, and wherein the format rule further specifies that the SEI message includes a syntax element indicating a number of intra random access point (IRAP) pictures or dependent random access point (DRAP) pictures that are within a same coded layer video sequence (CLVS) as the DRAP picture.
16. The apparatus of solution 15, wherein the IRAP pictures or the DRAP pictures are allowed to be included in active entries of a reference picture list of the DRAP picture, wherein the syntax element is coded as u(3) that is an unsigned integer using 3 bits or as ue(v) that is an unsigned integer using Exponential Golomb codes, wherein the format rule further specifies that the SEI message further includes a list of random access point (RAP) picture identifiers for the IRAP pictures or the DRAP pictures that are within the same coded layer video sequence (CLVS) as the DRAP picture, wherein the IRAP pictures or the DRAP pictures are allowed to be included in active entries of a reference picture list of the DRAP picture, and wherein each of the list of the RAP picture identifiers is coded the same as a RAP picture identifier for the DRAP picture associated with the SEI message.
17. A non-transitory computer-readable storage medium storing instructions that cause a processor to: perform a conversion between visual media data and a bitstream of the visual media data according to a format rule, wherein the format rule specifies that a supplemental enhancement information (SEI) message that refers to a dependent random access point (DRAP) picture is included in the bitstream, and wherein the format rule further specifies that the SEI message includes a syntax element indicating a number of intra random access point (IRAP) pictures or dependent random access point (DRAP) pictures that are within a same coded layer video sequence (CLVS) as the DRAP picture.
18. The non-transitory computer-readable recording medium of solution 17, wherein the IRAP pictures or the DRAP pictures are allowed to be included in active entries of a reference picture list of the DRAP picture, and wherein the syntax element is coded as u(3) that is an unsigned integer using 3 bits or as ue(v) that is an unsigned integer using Exponential Golomb codes, wherein the format rule further specifies that the SEI message further includes a list of random access point (RAP) picture identifiers for the IRAP pictures or the DRAP pictures that are within the same coded layer video sequence (CLVS) as the DRAP picture, wherein the IRAP pictures or the DRAP pictures are allowed to be included in active entries of a reference picture list of the DRAP picture, and wherein each of the list of the RAP picture identifiers is coded the same as a RAP picture identifier for the DRAP picture associated with the SEI message.

19. A non-transitory computer-readable recording medium storing a bitstream of a visual media data which is generated by a method performed by a visual media data processing apparatus, wherein the method comprises: determining that a supplemental enhancement information (SEI) message that refers to a dependent random access point (DRAP) picture is included in the bitstream; and generating the bitstream based on the determining.

20. The non-transitory computer-readable recording medium of solution 19, wherein the IRAP pictures or the DRAP pictures are allowed to be included in active entries of a reference picture list of the DRAP picture, and wherein the syntax element is coded as u(3) that is an unsigned integer using 3 bits or as ue(v) that is an unsigned integer using Exponential Golomb codes, and wherein the format rule further specifies that the SEI message further includes a list of random access point (RAP) picture identifiers for the IRAP pictures or the DRAP pictures that are within the same coded layer video sequence (CLVS) as the DRAP picture, and wherein the IRAP pictures or the DRAP pictures are allowed to be included in active entries of a reference picture list of the DRAP picture, and wherein each of the list of the RAP picture identifiers is coded the same as a RAP picture identifier for the DRAP picture associated with the SEI message.

21. A visual media data processing apparatus comprising a processor configured to implement a method recited in any one or more of solutions 1 to 14.

22. A method of storing a bitstream of visual media data, comprising a method recited in any one of solutions 1 to 14, and further including storing the bitstream to a non-transitory computer-readable recording medium.

23. A computer readable medium storing program code that, when executed, causes a processor to implement a method recited in any one or more of solutions 1 to 14.

24. A computer readable medium that stores a bitstream generated according to any of the above described methods.

25. A visual media data processing apparatus for storing a bitstream, wherein the video processing apparatus is configured to implement a method recited in any one or more of solutions 1 to 14.

26. A computer readable medium on which a bitstream complying to a format rule that is recited according to any of solutions 1 to 14.

In the solutions described herein, the visual media data corresponds to video or images. In the solutions described herein, an encoder may conform to the format rule by producing a coded representation according to the format rule. In the solutions described herein, a decoder may use the format rule to parse syntax elements in the coded representation with the knowledge of presence and absence of syntax elements according to the format rule to produce decoded video.

In the present document, the term "video processing" may refer to video encoding, video decoding, video compression or video decompression. For example, video compression algorithms may be applied during conversion from pixel representation of a video to a corresponding bitstream representation or vice versa. The bitstream representation of a current video block may, for example, correspond to bits that are either co-located or spread in different places within the bitstream, as is defined by the syntax. For example, a macroblock may be encoded in terms of transformed and coded error residual values and also using bits in headers and other fields in the bitstream. Furthermore, during conversion, a decoder may parse a bitstream with the knowledge that some fields may be present, or absent, based on the determination, as is described in the above solutions. Similarly, an encoder may determine that certain syntax fields are or are not to be included and generate the coded representation accordingly by including or excluding the syntax fields from the coded representation.

The disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any subject matter or of what may be claimed, but rather as descriptions of features that may be specific to particular embodiments of particular techniques. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

The invention claimed is:

1. A method of processing visual media data, comprising:
performing a conversion between visual media data and a bitstream of the visual media data according to a format rule,
wherein the format rule specifies whether and how a second type of supplemental enhancement information (SEI) message that is different from a first type of SEI message is included in the bitstream,
wherein the first type of SEI message indicates a first type of dependent random access point (DRAP) picture and the second type of SEI message indicates a second type of DRAP picture,
wherein the first type of DRAP picture is a picture that relies on an IRAP picture and is associated with the first type of SEI message, which is a first DRAP indication SEI message,
wherein the second type of DRAP picture is a picture that is allowed to rely on an IRAP picture or another DRAP picture and is associated with the second type of SEI message, which is a second DRAP indication SEI message,
wherein the format rule further specifies that each IRAP picture or DRAP picture is associated with a random access point (RAP) picture identifier variable (RapPicId), and a value of the RAP picture identifier variable (RapPicId) for the IRAP picture is inferred to be equal to 0,
wherein the format rule further specifies that the second type of SEI message includes a list of random access point (RAP) picture identifiers for IRAP pictures or second type of DRAP pictures that are within a same coded layer video sequence (CLVS) as the second type of DRAP picture, and
wherein each of the list of the RAP picture identifiers is coded the same as a RAP picture identifier for the second type of DRAP picture associated with the second type of SEI message.

2. The method of claim 1, wherein the format rule further specifies that the first type of SEI message or the second type of SEI message includes information on a picture order count (POC) value of the first type of the DRAP picture or the second type of the DRAP picture.

3. The method of claim 1, wherein the format rule further specifies that values of RAP picture identifiers for any two IRAP or DRAP pictures within the CLVS are different from each other.

4. The method of claim 1, wherein the format rule further specifies that values of RAP picture identifiers for IRAP or DRAP pictures within the CLVS are increasing in an increasing decoding order of the IRAP or DRAP pictures.

5. The method of claim 1, wherein the format rule further specifies that a value of the RAP picture identifier of the DRAP picture is one greater than a value of a previous IRAP or DRAP picture in a decoding order within the CLVS.

6. The method of claim 1, wherein the performing of the conversion includes generating the bitstream from the visual media data.

7. The method of claim 1, wherein the performing of the conversion includes reconstructing the visual media data from the bitstream.

8. An apparatus for processing visual media data comprising a processor and a non-transitory memory with instructions thereon, wherein the instructions upon execution by the processor, cause the processor to:
perform a conversion between visual media data and a bitstream of the visual media data according to a format rule,
wherein the format rule specifies whether and how a second type of supplemental enhancement information (SEI) message that is different from a first type of SEI message is included in the bitstream,
wherein the first type of SEI message indicates a first type of dependent random access point (DRAP) picture and the second type of SEI message indicates a second type of DRAP picture, wherein the first type of DRAP picture is a picture that relies on an TRAP picture and is associated with the first type of SEI message, which is a first DRAP indication SEI message, wherein the second type of DRAP picture is a picture that is allowed to rely on an TRAP picture or another DRAP picture and is associated with the second type of SEI message, which is a second DRAP indication SEI message, wherein the format rule further specifies that each TRAP picture or DRAP picture is associated with a random access point (RAP) picture identifier variable (RapPicId), and a value of the RAP picture identifier variable (RapPicId) for the IRAP picture is inferred to be equal to 0, wherein the format rule further specifies that the second type of SEI message includes a list of random access point (RAP) picture identifiers for IRAP pictures or second type of DRAP pictures that are within a same coded layer video sequence (CLVS) as the second type of DRAP picture, and wherein each of the list of the RAP picture identifiers is coded the same as a RAP picture identifier for the second type of DRAP picture associated with the second type of SEI message.

9. A non-transitory computer-readable storage medium storing instructions that cause a processor to:

perform a conversion between visual media data and a bitstream of the visual media data according to a format rule, wherein the format rule specifies whether and how a second type of supplemental enhancement information (SEI) message that is different from a first type of SEI message is included in the bitstream, wherein the first type of SEI message indicates a first type of dependent random access point (DRAP) picture and the second type of SEI message indicates a second type of DRAP picture, wherein the first type of DRAP picture is a picture that relies on an TRAP picture and is associated with the first type of SEI message, which is a first DRAP indication SEI message, wherein the second type of DRAP picture is a picture that is allowed to rely on an TRAP picture or another DRAP picture and is associated with the second type of SEI message, which is a second DRAP indication SEI message, wherein the format rule further specifies that each TRAP picture or DRAP picture is associated with a random access point (RAP) picture identifier variable (RapPicId), and a value of the RAP picture identifier variable (RapPicId) for the IRAP picture is inferred to be equal to 0, wherein the format rule further specifies that the second type of SEI message includes a list of random access point (RAP) picture identifiers for IRAP pictures or second type of DRAP pictures that are within a same coded layer video sequence (CLVS) as the second type of DRAP picture, and wherein each of the list of the RAP picture identifiers is coded the same as a RAP picture identifier for the second type of DRAP picture associated with the second type of SEI message.

10. A non-transitory computer-readable recording medium storing a bitstream of a visual media data which is generated by a method performed by a visual media data processing apparatus, wherein the method comprises:

determining, based on a format rule, whether and how a second type of supplemental enhancement information (SEI) message that is different from a first type of SEI message is included in the bitstream; and generating the bitstream based on the determining, wherein the first type of SEI message indicates a first type of dependent random access point (DRAP) picture and the second type of SEI message indicates a second type of DRAP picture, wherein the first type of DRAP picture is a picture that relies on an TRAP picture and is associated with the first type of SEI message, which is a first DRAP indication SEI message, wherein the second type of DRAP picture is a picture that is allowed to rely on an TRAP picture or another DRAP picture and is associated with the second type of SEI message, which is a second DRAP indication SEI message, wherein the format rule further specifies that each TRAP picture or DRAP picture is associated with a random access point (RAP) picture identifier variable (RapPicId), and a value of the RAP picture identifier variable (RapPicId) for the IRAP picture is inferred to be equal to 0, wherein the format rule further specifies that the second type of SEI message includes a list of random access point (RAP) picture identifiers for IRAP pictures or second type of DRAP pictures that are within a same coded layer video sequence (CLVS) as the second type of DRAP picture, and wherein each of the list of the RAP picture identifiers is coded the same as a RAP picture identifier for the second type of DRAP picture associated with the second type of SEI message.

11. The apparatus of claim 8, wherein the format rule further specifies that the first type of SEI message or the second type of SEI message includes information on a picture order count (POC) value of the first type of the DRAP picture or the second type of the DRAP picture.

12. The non-transitory computer-readable storage medium of claim 9, wherein the format rule further specifies that the first type of SEI message or the second type of SEI message includes information on a picture order count (POC) value of the first type of the DRAP picture or the second type of the DRAP picture.

13. The non-transitory computer-readable recording medium of claim 10, wherein the format rule further specifies that the first type of SEI message or the second type of SEI message includes information on a picture order count (POC) value of the first type of the DRAP picture or the second type of the DRAP picture.

14. The apparatus of claim 8, wherein the conversion includes generating the bitstream from the visual media data.

15. The apparatus of claim 8, wherein the conversion includes reconstructing the visual media data from the bitstream.

16. The method of claim 1, wherein for the first type of the DRAP picture or the second type of the DRAP picture, a random access point (RAP) picture identifier is included in the bitstream, and the RAP picture identifier is coded as u(16) that is an unsigned integer using 16 bits.

* * * * *